(12) United States Patent
Suzuki

(10) Patent No.: US 10,097,515 B2
(45) Date of Patent: Oct. 9, 2018

(54) FIREWALL CONTROL DEVICE, METHOD AND FIREWALL DEVICE

(71) Applicant: FUJITSU LIMITED, Kawasaki-shi, Kanagawa (JP)

(72) Inventor: Dai Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 15/251,706

(22) Filed: Aug. 30, 2016

(65) Prior Publication Data

US 2017/0093797 A1    Mar. 30, 2017

(30) Foreign Application Priority Data

Sep. 28, 2015  (JP) .................................. 2015-189657

(51) Int. Cl.
*H04L 29/06* (2006.01)
*G06F 9/455* (2018.01)

(52) U.S. Cl.
CPC ........ *H04L 63/0254* (2013.01); *H04L 63/029* (2013.01); *H04L 63/0218* (2013.01); *H04L 63/0263* (2013.01); *G06F 9/455* (2013.01)

(58) Field of Classification Search
CPC ............. H04L 63/0254; H04L 63/0218; H04L 63/0263; H04L 63/029
See application file for complete search history.

(56) References Cited

U.S. PATENT DOCUMENTS

| 8,484,372 B1* | 7/2013 | Callon .................... H04L 47/10 370/229 |
| 2002/0040396 A1* | 4/2002 | Yoshihara ........... H04L 41/0893 709/225 |
| 2003/0084150 A1* | 5/2003 | Hansen ............... H04L 41/0609 709/224 |
| 2005/0111367 A1* | 5/2005 | Chao ................... H04L 63/1408 370/235 |
| 2005/0144467 A1* | 6/2005 | Yamazaki ........... H04L 63/0227 713/189 |

(Continued)

FOREIGN PATENT DOCUMENTS

| JP | 2006-254137 | 9/2006 |
| JP | 2008-508805 | 3/2008 |

(Continued)

*Primary Examiner* — Robert B Leung
(74) *Attorney, Agent, or Firm* — Staas & Halsey LLP

(57) ABSTRACT

A firewall control device controls a plurality of firewall devices provided between a core network and a plurality of sub-networks respectively, the firewall control device is configured to receive, from the plurality of firewall devices, data amount information indicating an amount of the data discarded in the plurality of firewall devices respectively and node information indicating a transmission source node of the discarded data, identify, based on the data amount information and the node information, a data flow including the discarded data which is transmitted from an information processing device indicated by the node information and of which total amount of the discarded data exceeds a threshold value, and set, in a first firewall device which is included in the plurality of firewall devices and which is coupled to the information processing device, a first discarding flow entry defining discarding of data of the identified data flow.

10 Claims, 27 Drawing Sheets

(56) References Cited

U.S. PATENT DOCUMENTS

| | | | |
|---|---|---|---|
| 2006/0026669 A1 | 2/2006 | Zakas | |
| 2006/0036727 A1* | 2/2006 | Kurapati | H04L 63/1458 709/224 |
| 2006/0206608 A1 | 9/2006 | Naito et al. | |
| 2007/0064610 A1* | 3/2007 | Khandani | H04L 47/10 370/235 |
| 2008/0028467 A1* | 1/2008 | Kommareddy | H04L 63/1458 726/23 |

FOREIGN PATENT DOCUMENTS

| | | |
|---|---|---|
| JP | 2014-230157 | 12/2014 |
| JP | 2014-236461 | 12/2014 |
| JP | 2015-91106 | 5/2015 |

\* cited by examiner

FIG. 3

| FW IDENTIFIER | ENTRY NUMBER | SETTING SOURCE | TRANSMISSION SOURCE ADDRESS | DESTINATION ADDRESS | PROTOCOL | PORT NUMBER | SET PORT | RULE |
|---|---|---|---|---|---|---|---|---|
| 2 | 1 | ADMINISTRATOR | - | SUB-NW #2 | - | - | CORE NE → SUB-NW | deny |
| 2 | 2 | ADMINISTRATOR | - | SUB-NW #2 | TCP | 80 | CORE NE → SUB-NW | allow |
| 3 | 1 | FWC | - | SUB-NW #3 | TCP | - | CORE NE → SUB-NW | deny |
| 3 | 2 | ADMINISTRATOR | - | SUB-NW #3 | TCP | 80 | CORE NE → SUB-NW | allow |
| 4 | 1 | FWC | - | SUB-NW #4 | TCP | - | CORE NE → SUB-NW | deny |
| 4 | 2 | ADMINISTRATOR | - | SUB-NW #4 | TCP | 80 | CORE NE → SUB-NW | allow |
| ... | ... | ... | ... | ... | ... | ... | ... | ... |

721

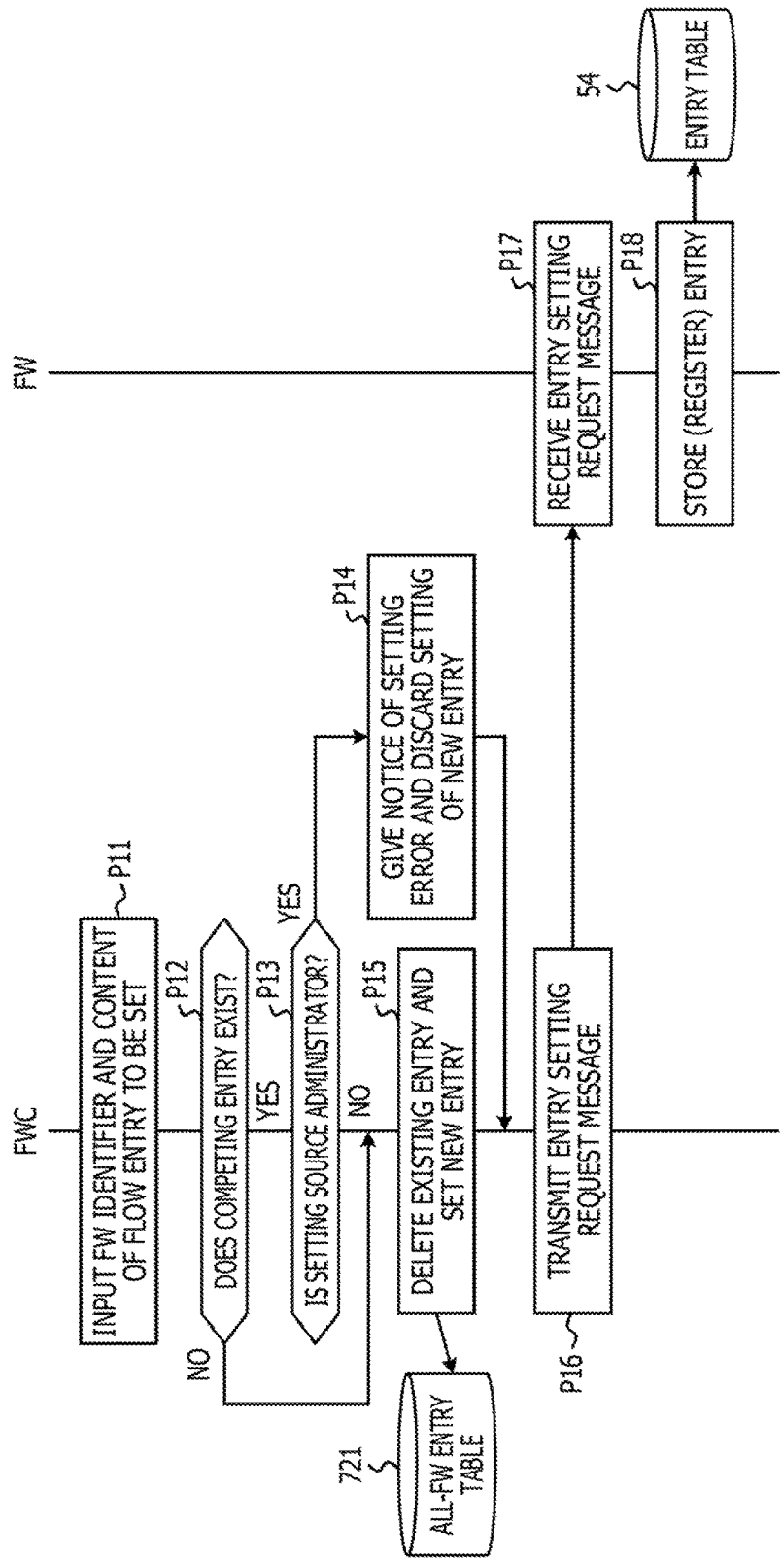

FIG. 9

| TRANSMISSION SOURCE ADDRESS | SERVICE IDENTIFIER | | DESTINATION ADDRESS | TOTAL NUMBER OF PACKETS |
|---|---|---|---|---|
| | PROTOCOL | PORT NUMBER | | |
| IP#1 (FLOW A) | TCP | 56 | IP#4 | 1168 |
| IP#2 (FLOW B) | UDP | 32 | IP#4 | 489 |
| ... | ... | ... | ... | ... |

THRESHOLD VALUE=1000

FIG. 14

| TRANSMISSION SOURCE ADDRESS | SERVICE IDENTIFIER | | DESTINATION ADDRESS | TOTAL NUMBER OF PACKETS |
|---|---|---|---|---|
| | PROTOCOL | PORT NUMBER | | |
| IP#1 | UDP | 35 | IP#2 (FLOW A) | 1168 |
| | | | IP#3 (FLOW B) | |
| | | | IP#4 (FLOW C) | |
| IP#3 | TCP | 89 | IP1 | 349 |
| ... | ... | ... | ... | ... |

THRESHOLD VALUE=1000

| FW IDENTIFIER | ENTRY NUMBER | SETTER | TRANSMISSION SOURCE ADDRESS | DESTINATION ADDRESS | PROTOCOL TYPE | PORT NUMBER | SET PORT | RULE |
|---|---|---|---|---|---|---|---|---|
| 1 | 1 | FWC | IP#1 | SUB-NETWORK #5 | UDP | 35 | SUB-NE → CORE NW | allow |
| 1 | 2 | FWC | IP#1 | — | UDP | 35 | SUB-NE → CORE NW | deny |
| ... | ... | ... | ... | ... | ... | ... | ... | ... |

FIG. 20

| TRANSMISSION SOURCE ADDRESS | SERVICE IDENTIFIER | | DESTINATION ADDRESS | TOTAL NUMBER OF PACKETS |
|---|---|---|---|---|
| | PROTOCOL | PORT NUMBER | | |
| IP#1 | UDP | 35 | IP#2 (FLOW A) | 1168 |
| | | | IP#3 (FLOW B) | |

THRESHOLD VALUE=1000

FIG. 21A

| dest=* | source=IP#1 | protocol=UDP | port=35 | deny | #1
| dest=IP#4 | source=* | protocol=UDP | port=35 | allow |

FIG. 21B

| dest=IP#2 | source=IP#1 | protocol=UDP | port=35 | deny |
|---|---|---|---|---|
| dest=IP#3 | source=IP#1 | protocol=UDP | port=35 | deny |
| dest=IP#4 | source=* | protocol=UDP | port=35 | allow |

} #2 (spanning first two rows)

FIG. 21C

| dest=IP#4 | source=IP#1 | protocol=UDP | port=35 | allow |
|---|---|---|---|---|
| dest=* | source=IP#1 | protocol=UDP | port=35 | deny |

FIREWALL CONTROL DEVICE, METHOD AND FIREWALL DEVICE

CROSS-REFERENCE TO RELATED APPLICATION

This application is based upon and claims the benefit of priority of the prior Japanese Patent Application No. 2015-189657, filed on Sep. 28, 2015, the entire contents of which are incorporated herein by reference.

FIELD

The technology described in the present specification is related to a firewall control device, a method and a firewall device.

BACKGROUND

In order to control a passage or blocking of a traffic to flow through a network, a firewall (FW) is provided at a coupling point between networks in some cases.

The FW is provided in a sub-network at, for example, a company office or the like coupled to a wide area network (may be called a "core network"), in some cases. The FW causes only desired traffics to pass from the core network to the sub-network and discards other traffics, thereby enabling the security of the sub-network to be enhanced. Note that the "traffic" may be called a "data flow" or simply called a "flow". As documents of the related art, there are Japanese Laid-open Patent Publication No. 2015-91106, Japanese Laid-open Patent Publication No. 2014-236461, Japanese National Publication of International Patent Application No. 2008-508805, Japanese Laid-open Patent Publication No. 2006-254137, and Japanese Laid-open Patent Publication No. 2014-230157.

SUMMARY

According to an aspect of the invention, a firewall control device configured to control a plurality of firewall devices provided between a core network and a plurality of sub-networks respectively, the plurality of firewall devices being configured to discard received data based on discarding flow entries defining discarding of data, the firewall control device includes a memory, and a processor coupled to the memory and configured to receive, from the plurality of firewall devices, data amount information indicating an amount of the data discarded in the plurality of firewall devices respectively and node information indicating a transmission source node of the discarded data, identify, based on the data amount information and the node information, a data flow including the discarded data which is transmitted from an information processing device indicated by the node information and of which total amount of the discarded data exceeds a threshold value, and set, in a first firewall device which is included in the plurality of firewall devices and which is coupled to the information processing device, a first discarding flow entry defining discarding of data of the identified data flow.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an all-FW entry table stored in an all-FW entry information storage unit in a firewall controller (FWC) exemplified in FIG. 1;

FIG. 4 is a sequence diagram illustrating an example of a procedure used by an administrator to set a flow entry in a FW via the FWC in the communication system exemplified in FIG. 1;

FIG. 9 is a diagram illustrating an example of a totalization result of discarded-packet information according to an embodiment;

FIG. 14 is a diagram illustrating an example of a totalization result of the discarded-packet information in the first example of a modification;

FIG. 15 is a diagram illustrating an example of a discarding entry set in a transmission source FW in the first example of a modification;

FIG. 20 is a diagram illustrating an example of a totalization result of the discarded-packet information in the second example of a modification;

FIG. 21A is a diagram illustrating an example of an entry candidate list A in the second example of a modification, FIG. 21B is a diagram illustrating an example of an entry candidate list B in the second example of a modification, and FIG. 21C is a diagram illustrating an example of an entry list A in the second example of a modification;

DESCRIPTION OF EMBODIMENTS

Traffics discarded by a FW included in a sub-network corresponding to the receiving side of the traffics are traffics undesired for a core network. Since a FW is included in a sub-network corresponding to the transmitting side of the traffics, it is considered that the FW on the transmitting side blocks the undesired traffics.

However, for, for example, the reason that administrators of FWs differ from one network to another, settings of traffics to be caused to pass or to be blocked are individually set for the FWs on the transmitting side and the receiving side in some cases. By doing so, undesired traffics to be blocked on the receiving-side FW pass through the FW on the transmitting side and flow to the core network, and a transmission band of the core network turns out to be wasted by the undesired traffics.

In addition, a sender addresses, to recipients, and transmits undesired traffics in some cases. In this case, even if a traffic amount discarded by a FW at one place is small, undesired traffics corresponding to the total of traffic amounts to be discarded by FWs turn out to flow through the core network.

In one aspect, an object of the technology described in the present specification is to cause undesired data to be discarded by a transmission source FW, the undesired data being to be discarded by a receiving-side FW, thereby enabling to inhibit the undesired data from flowing through a network lying between both the FWs.

Hereinafter, embodiments will be described with reference to drawings. In this regard, however, the embodiments to be described later are merely exemplifications, and there is no intention to exclude various modifications and various applications of the technology, unspecified hereinafter. In addition, various kinds of exemplary embodiments to be described later may be arbitrarily combined and implemented. Note that, unless otherwise noted, a portion to which the same symbol is assigned in drawings used in the following embodiments indicates the same portion or a similar one.

Figure 1:
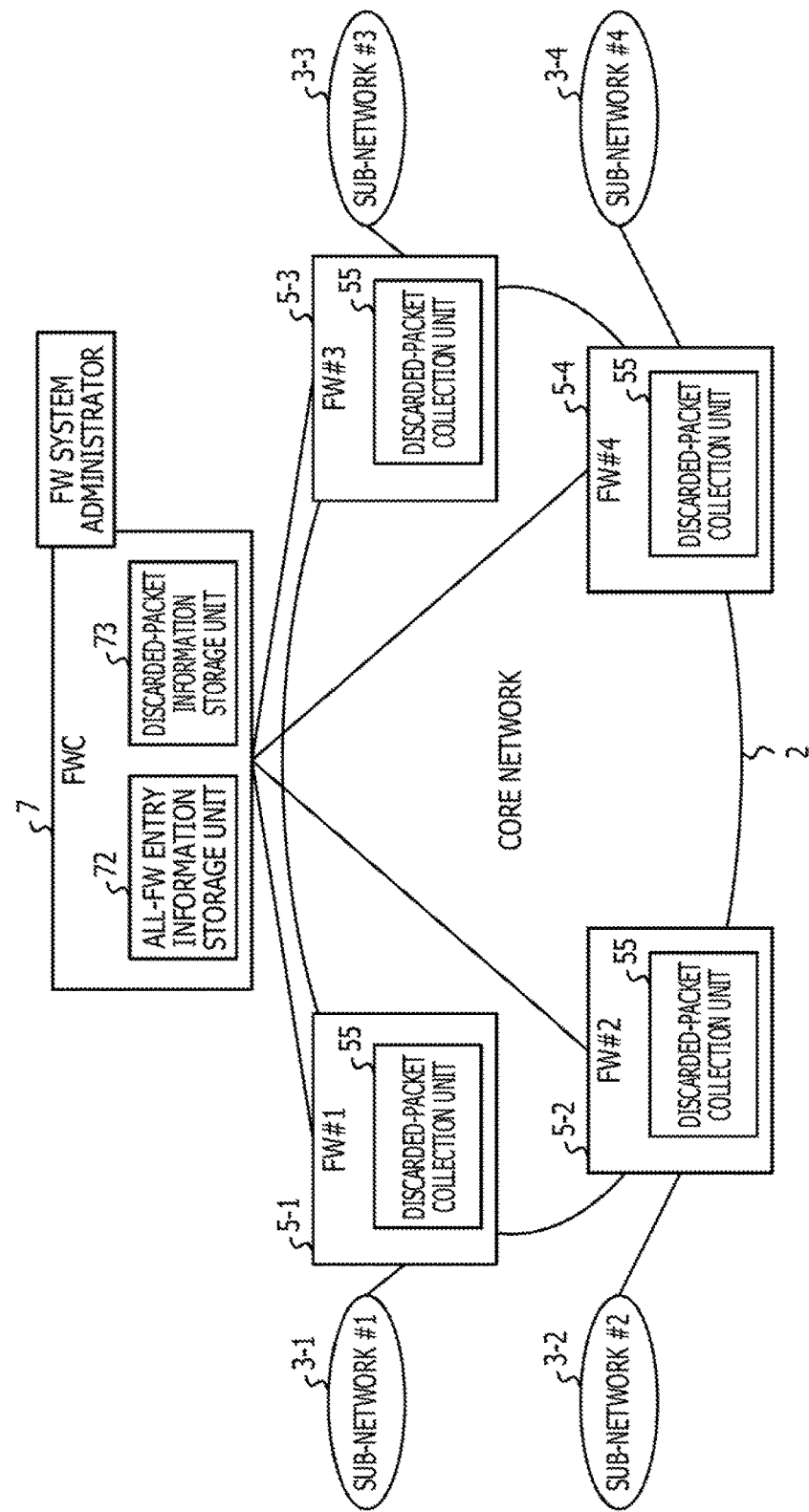
FIG. 1 is a block diagram illustrating an example of a configuration of a communication system according to an embodiment.

FIG. 1 is a block diagram illustrating an example of a configuration of a communication system according to an embodiment. A communication system 1 illustrated in FIG. 1 may exemplarily include a core network 2 and sub-networks 3-1 to 3-N (#1 to #N) coupled to the core network 2. "N" is exemplarily an integer greater than or equal to "2", and N=4 is satisfied in the example of FIG. 1.

In a case where the sub-networks 3-1 to 3-N do not have to be differentiated, each of the sub-networks 3-1 to 3-N is abbreviated to a "sub-network 3-i" (i=one of 1 to N) or simply abbreviated to a "sub-network 3" in some cases. A network address assigned to the corresponding sub-network 3 may be conveniently abbreviated to a "subnet address".

The core network 2 may be called a wide area network (WAN). Each of the sub-networks 3 may be exemplarily a network such as a local area network (LAN) constructed in a company office. Each of the core network 2 and the sub-networks 3 is an example of a communication network.

A communication device coupled to one sub-network 3-i is able to communicate, via the core network 2, with a communication device coupled to the other sub-network 3-j (j is one of 1 to N and is an integer satisfying i≠j).

The "communication device" may be called a "communication node", may be simply called a "node", or may be called a network element (NE). An example of a node belonging to the sub-networks 3 is a communication terminal used by an end-user.

A firewall (FW) 5-x (#x) may be provided at a coupling point between the core network 2 and the corresponding sub-network 3. "x" is exemplarily an integer greater than or equal to "2". In the example of FIG. 1, in a case where x=one of 1 to 4 is satisfied and FWs 5-x serving as FWs 5-1 to 5-4 (#1 to #4) provided at coupling points between the core network 2 and the 4 sub-networks 3-1 to 3-4, respectively, do not have to be differentiated, the FWs 5-x are abbreviated to "FWs 5" in some cases.

In this regard, however, the FWs 5 may be provided within the respective sub-networks 3 or may be provided within the core network 2. In addition, 2 or more FW functions 5 may be provided to one of the sub-networks 3, or 1 FW function 5 may be provided to 2 or more of the sub-networks 3.

Each of the FWs 5 may be exemplarily included in an NE to couple the core network 2 and the corresponding sub-network 3. The NE to couple the core network 2 and the corresponding sub-network 3 may be a gateway (GW), a router, a bridge, or a switch or may be a computer equipped with a communication function.

Hereinafter, a communication device equipped with one of the FWs 5 is conveniently called a "FW apparatus 5" or a "FW device 5" in some cases.

The FWs 5 may be exemplarily coupled to a FWC 7 so as to be communicatable therewith and may be intensively managed and controlled by the FWC 7. The communication system 1 including the FWs 5 and the FWC 7 may be conveniently called a "FW system 1".

The FWC 7 may be realized as a device dedicated to managing and controlling the FWs 5 or may be realized, in a computer such as a general-purpose server, by software to cause the relevant computer to function as the FWC 7 being executed.

Note that the FWs 5 may be fixedly embedded in NEs or may be exemplarily provided so as to be able to be generated and deleted as virtual machines (VMs). In, for example, the FWC 7, some or all of the FWs 5 may be generated as VMs.

In addition to the FWs 5, the FWC 7 may be provided so as to be able to be generated and deleted as a VM. In, for example, a computer such as a general-purpose server, the VM of the FWC 7 and the VMs of the FWs 5 may be generated. In this case, the FWC 7 and the FWs 5 are able to communicate with one another, based on communication between the VMs.

In other words, some or all of the FWC 7 and the FWs 5 may be real machines or may be VMs.

Each of the FWs 5 exemplarily stores therein information or data in which traffics permitted to pass between the core network 2 and the corresponding sub-network 3 and traffics to be blocked therebetween are registered. The "traffic" may be called a "data flow" or may be simply called a "flow". The information or data for controlling a passage or blocking (may be called "discarding") of a flow may be conveniently called a "flow entry" or simply called an "entry".

Based on entries, each of the FWs 5 may identify flows to be permitted to pass through the relevant FW 5 and flows to be blocked by the relevant FW 5, may cause data of the flows caused to pass to pass therethrough, and may discard data of the flows to be blocked. The contents of the flow entries may be exemplarily determined in accordance with a policy (may be called a "FW policy") related to the FW in the corresponding sub-network 3.

Note that data of a flow caused to pass or to be blocked may be exemplarily packet data or frame data. The packet data may be simply abbreviated to a "packet", and the frame data may be simply abbreviated to a "frame". The "frame" may be exemplarily an Ethernet frame. The "Ethernet" is a registered trademark.

As a setting method for flow entries in each of the FWs 5, 2 methods are considered.

The first method is a method in which an administrator of one of the FWs 5 inputs setting information to the FWC 7, thereby setting, from the FWC 7, flow entries in the respective FWs 5. The administrator of one of the FWs 5 may be equal to an administrator of the FW system 1 or may be different therefrom. Note that the "administrator" may be called an "operator" or a "user".

The administrator of, for example, one of the FWs 5 may specify, for the FWC 7, the FWs 5 to serve as flow entry setting targets and contents of flow entries to be set. The FWC 7 communicates with the specified FWs 5, thereby setting and registering the contents of flow entries in the relevant FWs 5.

An entry setting (or deletion) request message may be exemplarily used for the setting and registration (or deletion) of flow entries, performed on the FWs 5 by the FWC 7. The entry setting (or deletion) request message is an example of a control message transmitted and addressed to each of the relevant FWs 5. The "control message" is an example of a "control signal".

Figure 2:
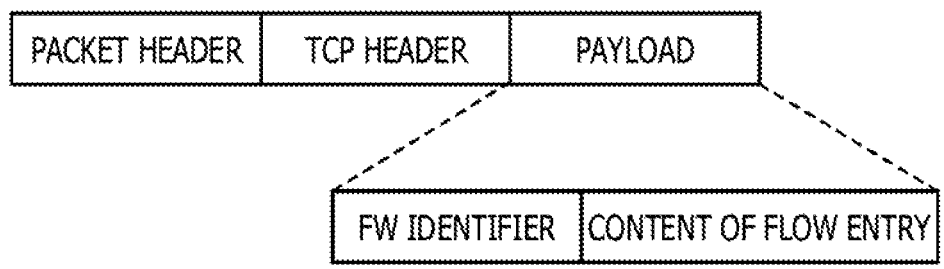
FIG. 2 is a diagram illustrating an example of a format of a request message to set or delete an entry according to an embodiment.

FIG. 2 illustrates an example of a format of the entry setting (or deletion) request message. As exemplified in FIG. 2, the entry setting (or deletion) request message may include respective fields of a packet header, a transmission control protocol (TCP) header, and a payload.

In the payload, an identifier of the FW #x (may be called a "FW identifier") to serve as a target of a setting (or deletion) of a flow entry and a content of the flow entry to be set (or deleted) may be set. It may be conveniently thought that "#x" corresponds to the FW identifier.

The second method is a method in which an administrator of one of the FWs 5 inputs and sets information of flow entries in the relevant FW 5. In the second method, in response to update of flow entries, the relevant FW 5 may address, to the FWC 7, and transmit contents updated in the flow entries.

In each of the first and second methods, upon receiving inputting of flow entries to be newly set, the FWC 7 may implement a competition check with existing flow entries. Note that the flow entries to be newly set may be abbreviated to "new entries". In addition, the existing flow entries may be abbreviated to "existing entries".

Exemplarily the competition check is checking whether or not there is a flow entry in which a different (in other words, contradictory) rule turns out to be applied to a packet of the same flow between a new entry and an existing entry.

With reference to, for example, a storage unit 72 (see FIG. 1), the FWC 7 may examine whether or not there is an existing entry in which different rules of "transfer" and "discarding" turn out to be applied to a packet of the same flow by setting a new entry.

Information 721 (may be conveniently called an "all-FW entry table 721") of flow entries of all the FWs 5 serving as management targets of the FWC 7 may be stored in the storage unit 72 (see, for example, FIG. 3). Therefore, the storage unit 72 may be conveniently called an "all-FW entry information storage unit 72".

There is a case where flow entries are set by an administrator of one of the FWs 5, and there is a case where flow entries are autonomously set by the FWC 7 as described later. In order to distinguish between the two cases, information (may be called "setting source information") indicating whether a setting source of flow entries is an administrator or the FWC 7 may be stored in the storage unit 72 along with the flow entries. As illustrated in, for example, FIG. 3, the setting source information may be registered in the all-FW entry table 721.

In a case where the existence of an existing entry to compete with a new entry is confirmed, the FWC 7 may confirm a setting source of the competing existing entry, based on the "setting source information".

If the setting source of the competing existing entry is an administrator of one of the FWs 5, the FWC 7 may notify the administrator of the relevant FW 5 of, for example, a setting error and may discard input information of the new entry.

If the setting source of the competing existing entry is the FWC 7, the FWC 7 may delete the competing existing entry and may set and register the new entry in the all-FW entry table 721.

Hereinafter, specific examples of the first and second methods will be described.

(First Method)

First, a procedure in which an administrator of the FW #2 sets a new flow entry for the FW #2 via the FWC 7 in the example of a configuration in FIG. 1 will be described with reference to FIG. 4.

It is assumed that a setting in which packets of a flow whose TCP port number is "80" are caused to pass, the flow being addressed to the sub-network #2 coupled to the FW #2, and packets of flows other than the relevant flow are discarded is performed on, for example, the relevant FW #2. In this regard, however, it is assumed that a flow entry in which packets are to be discarded for all flows is set, as an initial setting, in each of the FWs #1 to #4.

First, the administrator of the FW #2 inputs, to the FWC 7, an identifier of the FW #2 and a content of a flow entry for permitting a flow, which has a destination address=(a network address of the sub-network #2) and a TCP port number=80, to pass (processing operation P11). Note that "permitting to pass" may be restated as "transfer". The "destination address" is an example of destination information indicating a destination of a packet.

Upon receiving the relevant input, the FWC 7 may reference the all-FW entry table 721 in the storage unit 72 and may check whether there is an entry to compete with the content of the new entry among existing entries already set in the FW #2 (processing operation P12).

In a case where the competing existing entry exists (processing operation P12: YES), the FWC 7 may reference, for example, the "setting source information" of the all-FW entry table 721 and may confirm a setting source of the relevant existing entry (processing operation P13).

In a case where, as a result of the confirmation, the setting source of the competing existing entry is the administrator (processing operation P13: YES), the FWC 7 may notify the administrator of the FW #2 of a setting error and may discard the setting of the new entry for the FW #2 (processing operation P14).

On the other hand, in a case where the setting source of the competing existing entry is the FWC 7 (processing operation P13: NO), the FWC 7 may delete the competing existing entry and may implement setting processing of the new entry for the FW #2 (processing operation P15).

In a case where no competing existing entry exists (in a case of NO in the processing operation P12), the FWC 7 may implement the setting processing of the new entry for the FW #2 (processing operation P15).

In the setting processing of the new entry (P15), the FWC 7 stores the new entry for the FW #2 in, for example, the all-FW entry table 721 in the storage unit 72. In addition, the FWC 7 causes the content of the new entry to be included in, for example, the entry setting request message illustrated in FIG. 2 and addresses, to the FW #2 specified by the administrator of the FW #2, and transmits the entry setting request message (processing operation P16).

Figure 24:
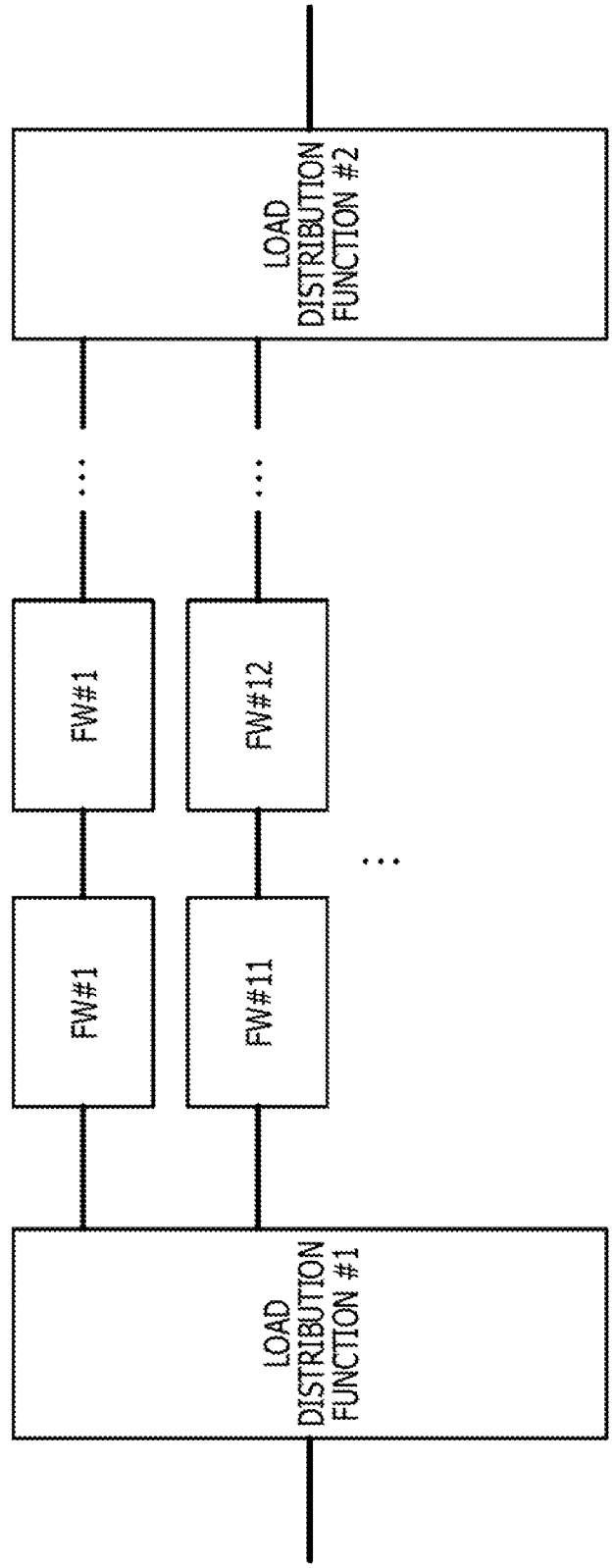
FIG. 24 is a pattern diagram for explaining auto-scaling according to a fifth example of a modification to an embodiment.

In response to reception of the entry setting request message (processing operation P17), the FW #2 stores therein a content of a FW entry included in the relevant message (processing operation P18). The FW #2 stores an entry table 54 (described later in FIG. 24) in, for example, an internal storage unit and may register, in the relevant entry table 54, the content of the flow entry included in the entry setting request message.

In the above-mentioned example, the flow entry for transferring the flow that has the destination address=(the network address of the sub-network #2) and a TCP port number=80 is set and registered in the entry table 54 in the FW #2.

In the same way as described above, by using the entry setting request message, it is possible to set and register a flow entry for each of the FWs #3 and #4.

FIG. 3 illustrates an example of the all-FW entry table 721 after completion of such a flow entry setting as described above.

In the example of FIG. 3, a flow entry (the entry number thereof=2) in which a flow having destination address=(a network address of the sub-network #x) and a TCP port number=80 is to be transferred is registered, for the FW #x, in the all-FW entry table 721.

Note that the example of FIG. 3 illustrates that regarding flow entries each having an entry number=1, each of flows having entry numbers other than an entry number=2 is to be blocked (denied) and discarded in the FW #x. It may be though that, in FIG. 3, flow entries identified by FW identifiers are registered in the entry table 54 of the FW #x.

(Second Method)

Next, a procedure in which an administrator of one of the FWs 5 directly sets a flow entry for the relevant FW 5 in the example of a configuration exemplified in FIG. 1 will be described with reference to FIG. 5. It is exemplarily assumed that a flow entry is set for the FW #2.

The administrator of the FW #2 inputs, to the FW #2, information of, for example, a flow entry for transferring a flow, which has a destination address=(the network address of the sub-network #2) and a TCP port number=80 (processing operation P21).

Upon receiving the relevant input, the FW #2 may reference the internally stored entry table 54 and may check whether there is an entry to compete with the new entry, in the same way as the competition check in the FWC 7 (processing operation P22).

In a case where the existing entry to compete with the new entry exists (processing operation P22: YES), the FW #2 may confirm, based on the "setting source information", whether the competing existing entry is a flow entry input by the administrator (processing operation P23).

In a case where, as a result of the confirmation, the competing existing entry is a flow entry input by the administrator (processing operation P23: YES), the FW #2 may notify the administrator of a setting error and may discard the setting of the new entry (processing operation P24).

In a case where the competing existing entry is not a flow entry input by the administrator (processing operation P23: NO), the FW #2 may delete the competing existing entry and may set and register, in the entry table 54, the new entry corresponding to the input of the administrator (processing operation P25).

In a case where no competing existing entry exists (in a case of NO in the processing operation P22), the FW #2 may set and register, in the entry table 54, the new entry corresponding to the input of the administrator (processing operation P25).

In response to the update of the entry table 54, the FW #2 may address, to the FWC 7, and transmit updated information of flow entries (processing operation P26). In accordance with the update information of flow entries, received from the FW #2, the FWC 7 may update the all-FW entry table 721 in the storage unit 72 (processing operation P27).

From this, it is possible to achieve synchronization between a content of the entry table 54 stored by the FW #2 and a content of the all-FW entry table 721 stored by the FWC 7.

(Example of Method for Setting Flow Entry for Transmitting-Side FW)

Next, there will be described an example of a method in which, based on a flow entry set for one of the FWs 5 (conveniently expressed as a "reception FW 5"), which receives a flow, an administrator performs a setting on one of the FWs 5 (conveniently expressed as a "transmission source FW 5"), which corresponds to a transmitting side of the relevant flow.

Figure 5:
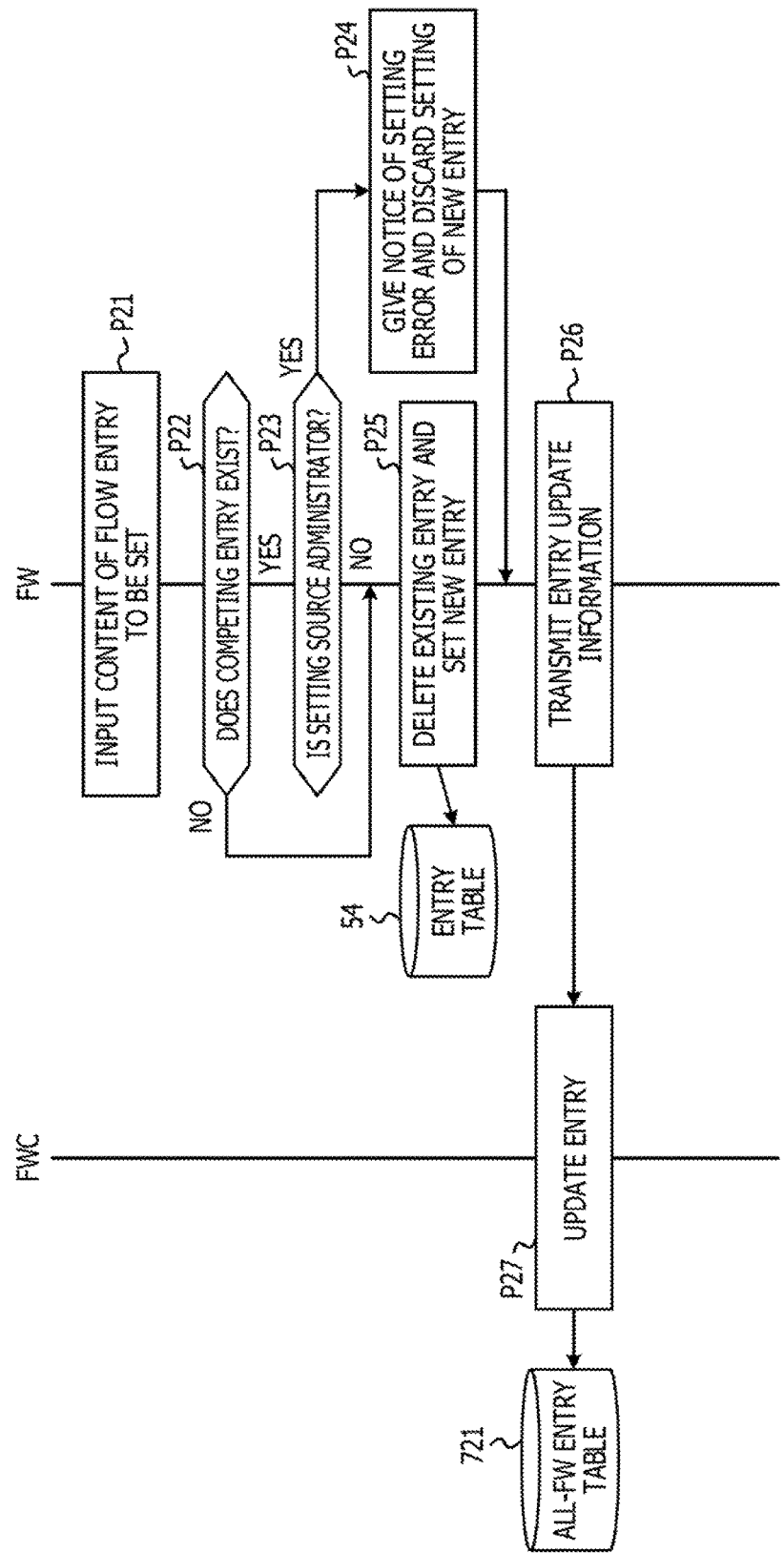
FIG. 5 is a sequence diagram illustrating an example of a procedure used by the administrator to directly set a flow entry in the FW in the communication system exemplified in FIG. 1.
Figure 6:
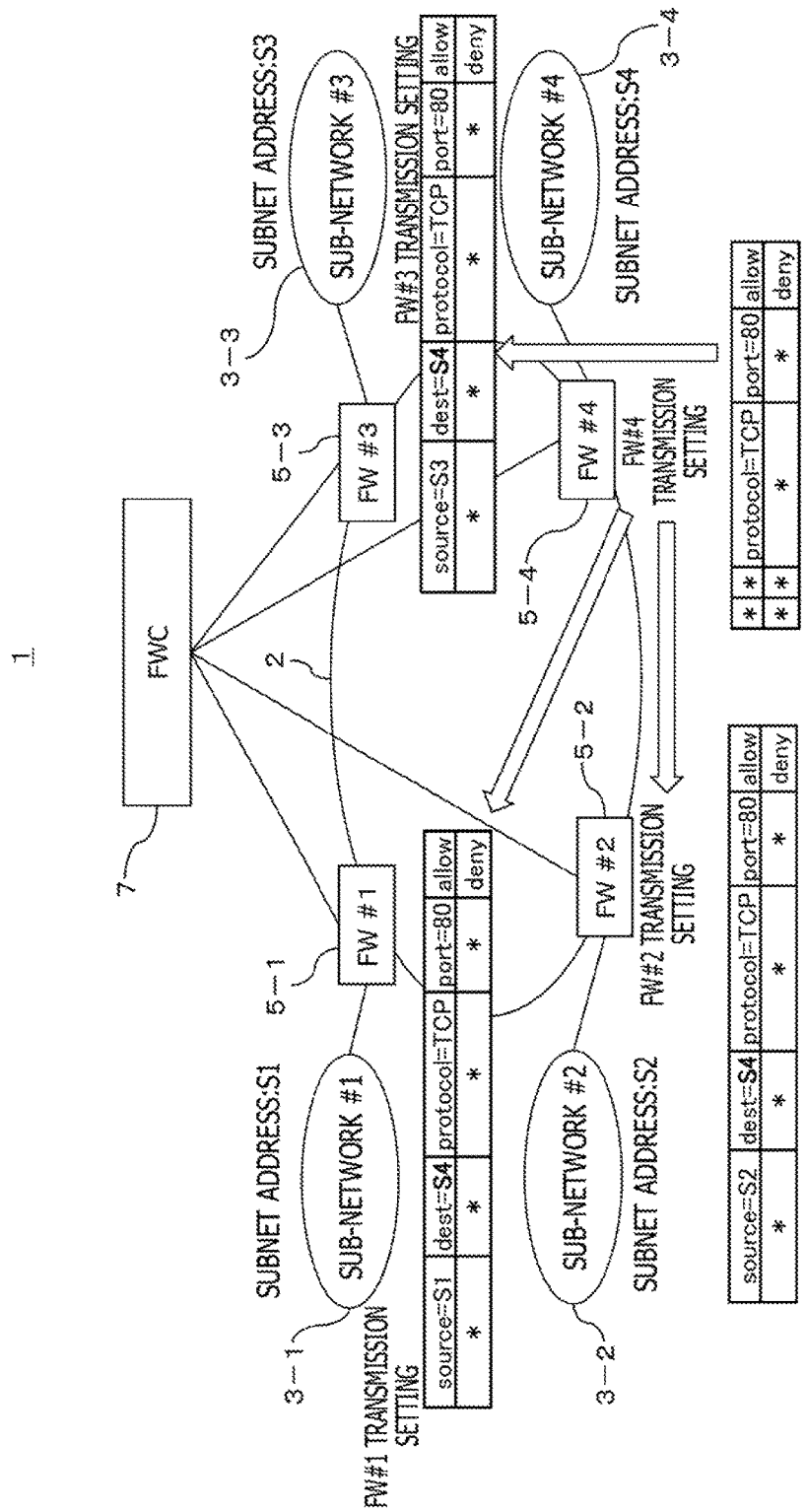
FIG. 6 is a diagram for explaining an example of a method for setting a flow entry in a transmitting-side FW in the communication system exemplified in FIG. 1.

It is assumed that, as illustrated in, for example, in FIG. 6, a new entry for permitting the transfer of a flow having the TCP port number="80" is set for the FW #4 in accordance with the procedure exemplified in FIG. 4 or FIG. 5. In addition, it is assumed that a transmission source address and a destination address are unspecified in the relevant new entry. Note that the "transmission source address" is an example of transmission source information indicating a transmission source of a packet.

In this case, since the transmission source address is unspecified, there is a possibility that packets of flows corresponding to the new entry are addressed, to the FW #4, and transmitted from all the sub-networks 3. Therefore, in response to the setting of the new entry for the reception FW #4, the FWC 7 may set and register, based on the new entry set in the reception FW #4, new entries for the other FWs (transmission source FWs) #1 to #3 each having the possibility of transmitting packets to the reception FW #4.

The FWC 7 may set, in the transmission source FW #x, for example, a new entry having a transmission source address, which is a network address Sx of the sub-network x corresponding to the transmission source FW #x, and a destination address, which is a sub-network address S4 corresponding to the reception FW #4.

In an example of FIG. 6, the FWC 7 may set, for the FW #1, a new entry for permitting transfer of a packet having a transmission source address=S1, a destination address=S4, and a TCP port number=80.

In the same way, the FWC 7 may set, for the FW #2, a new entry for permitting transfer of a packet having a transmission source address=S2, a destination address=S4, and a TCP port number=80.

In addition, the FWC 7 may set, for the FW #3, a new entry for permitting transfer of a packet having a transmission source address=S3, a destination address=S4, and a TCP port number=80.

Note that the already-described entry setting request message (see FIG. 2) may be used for the setting and registration of a new entry for the transmission source FW #x.

As described above, if an entry for permitting transfer of a specific flow is set for the FW #4, the FWC 7 may set a new entry for permitting transfer of the relevant flow, for each of the FWs #1 to #3 each corresponding to a transmission source of the relevant flow.

From this, it is possible to perform a setting so that only packets permitted to be transferred by the reception FW #4 are permitted to be transferred by the transmission sources FWs #1 to #3.

Note that in a case where a new entry for discarding packets of a specific flow (in other words, denying transfer of the specific flow) is set for the reception FW 5, the FWC 7 may implement a setting and registration of a new entry for a transmission source FW 5 in the same way as described above.

In addition, in the new entry set in the reception FW 5, a transmission source address is specified some cases. In this case, based on the specified transmission source address, the FWC 7 may identify the transmission source FW 5 to serve as a target in which a new entry is to be set.

Figure 7:
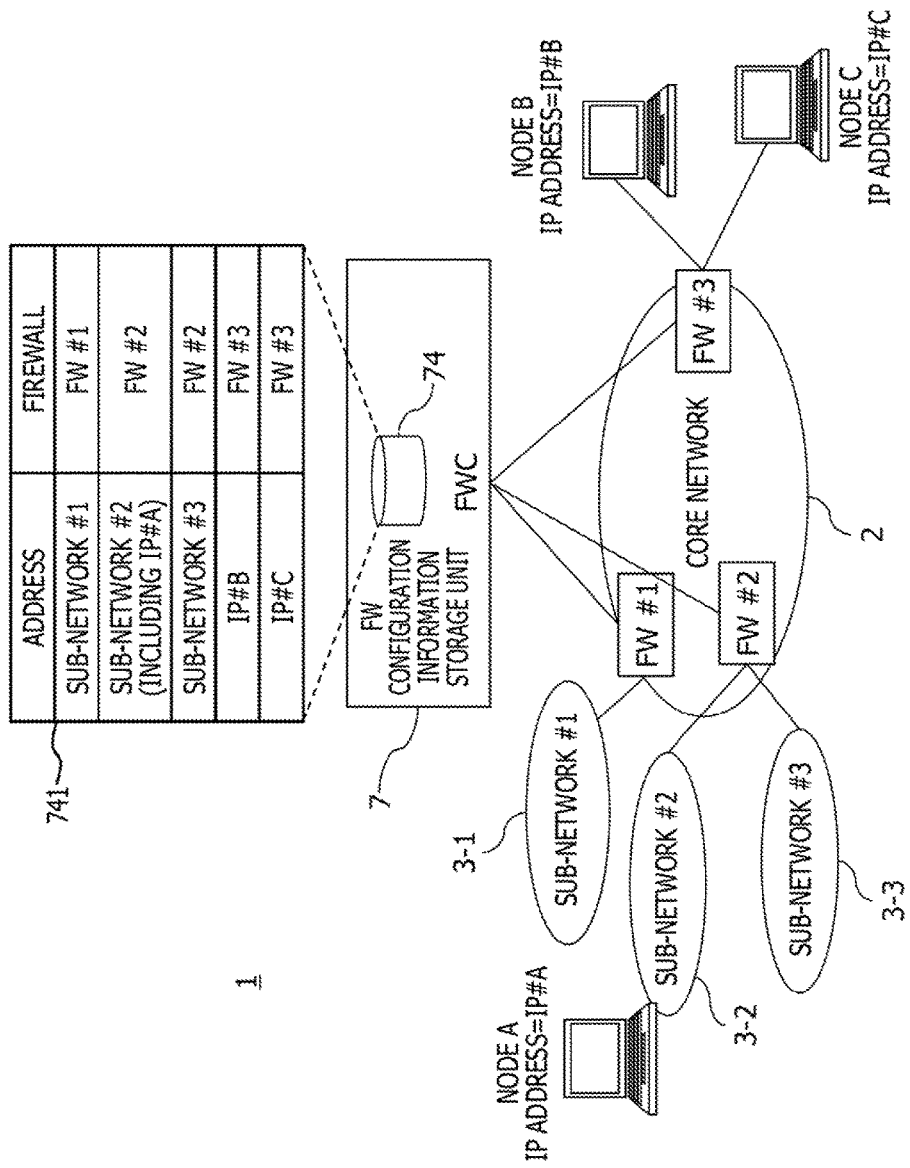
FIG. 7 is a diagram for explaining a FW configuration information storage unit included in the FWC exemplified in FIG. 1.

As illustrated in, for example, FIG. 7, the FWC 7 may include a FW configuration information storage unit 74.

Information, which includes address information of the sub-networks 3 or nodes coupled to the core network 2 and an identifier of the FW 5 corresponding to the relevant address information, may be exemplarily stored in the FW configuration information storage unit 74.

In the example of FIG. 7, the identifier of the FW #1 is registered so as to correspond to the address information of the sub-network #1, and the identifier of the FW #2 is registered so as to correspond to the pieces of address information of the respective sub-networks #2 and #3. In addition, the identifier of the FW #3 is registered so as to correspond to the address information IP#B of a node B and the address information IP#C of a node C.

Such information 741 in which pieces of address information of the sub-networks 3 or the nodes are associated with the FW identifiers may be conveniently called "FW configuration information" 741 or a "FW configuration information table" 741.

Note that the address information of one of the sub-networks 3 may be included in the address information of a node belonging to the relevant sub-network 3. In other words, the address information of a node may be expressed so as to include the address information of the corresponding sub-network 3 to which the relevant node belongs. The address information (IP#A) of, for example, a node A belonging to the sub-network #2 may be expressed by using the address information of the sub-network #2.

The FWC 7 exemplarily searches, within the FW configuration information table 741, for an entry including the transmission source address specified in the new entry, thereby identifying the FW 5 corresponding to the relevant transmission source address. The identified FW 5 is the transmission source FW 5 to serve as a new entry setting target.

In a case where it is assumed that, in, for example, FIG. 7, the address information IP#A of the node A is specified as a transmission source address, the FWC 7 searches, within the FW configuration information table 741, for an entry including the relevant IP#A.

The sub-network 3 including the IP#A of the node A is the sub-network #2. Therefore, in the FW configuration information table 741, the FWC 7 identifies that the FW #2 corresponding to the sub-network #2 is the transmission source FW 5 to serve as the new entry setting target.

As described in FIG. 6, for the identified transmission source FW #2, the FWC 7 performs a setting of a new entry corresponding to the new entry set in the reception FW 5.

As described above, even if the flow entry specifying the transmission source address is set for the reception FW 5, the FWC 7 is able to identify, based on the specified transmission source address, an adequate transmission source FW 5 and to set an adequate new entry for the identified transmission source FW 5.

(Example of Operation of FW System 1)

Next, an example of an operation of the FW system 1 in which flow entries are set for the individual FWs #x will be described with reference to FIG. 8 to FIG. 11. Based on the example of an operation described later, it is possible to reduce undesired traffics to flow through the core network 2.

Figure 8:
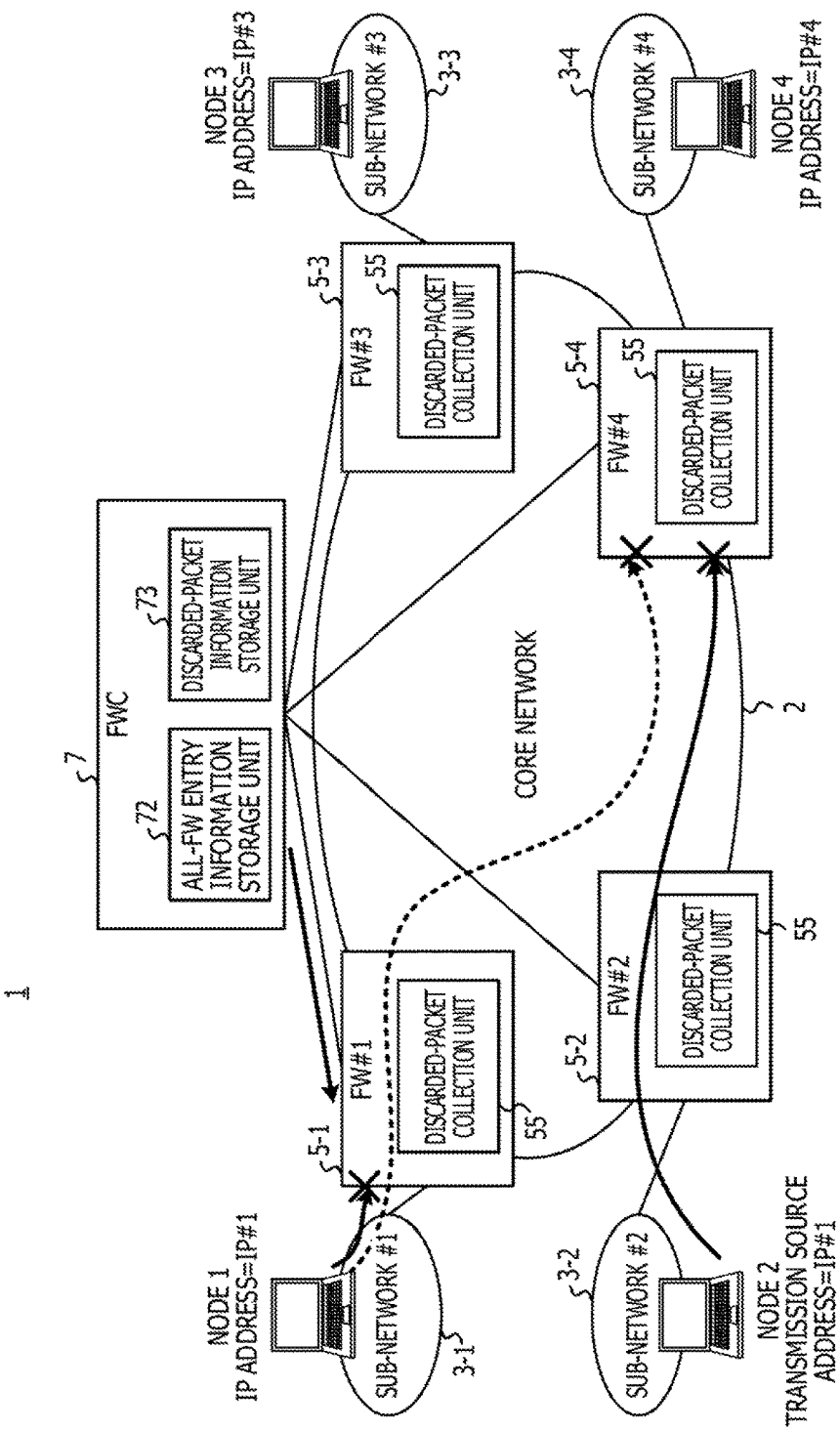
FIG. 8 is a diagram for explaining an example of an operation of the communication system exemplified in FIG. 1.

A situation in which, as exemplified in FIG. 8, a flow A, addressed to a node #4 belonging to the sub-network #4, flows, via the FW #1, from a node #1 belonging to the sub-network #1 and the relevant flow A is discarded by the FW #4 is assumed.

In addition, a situation in which a flow B, addressed to the node #4 belonging to the sub-network #4, flows, via the FW #2, from a node #2 belonging to the sub-network #2 and the relevant flow B is discarded by the FW #4 is assumed.

In such a situation, in a set time period (may be called a "unit time period" or a "measurement time period"), the FW #4 collects information of packets discarded in accordance with a flow entry (may be abbreviated to "discarded-packet information") for each of the flows A and B.

The discarded-packet information may exemplarily include header information of the discarded packets. The header information may include a transmission source address, a service identifier, and a destination address. The transmission source address, the service identifier, and the destination address are examples of parameters able to be set in a packet header.

The service identifier is an example of a parameter able to identify the service type of communication. The service identifier may be exemplarily expressed by a combination of the protocol type of packet and a port number thereof. In this regard, however, the service identifier may be replaced with another parameter.

While the transmission source address and the destination address may be exemplarily IP addresses, the transmission source address and the destination address may be addresses based on another communication protocol.

The discarded-packet information may be exemplarily totalized for each of packets each having an identical transmission source address, an identical destination address, and an identical service identifier (exemplarily includes a protocol type and a port number). FIG. 9 illustrates an example of a totalization result of the discarded-packet information.

An example of FIG. 9 indicates that 1168 packets each having a transmission source address=IP#1 (the flow A), a protocol type=TCP, a port number=56, and a destination address=IP#4 are discarded in the measurement time period.

In addition, it illustrates that 489 packets each having a transmission source address=IP#2 (the flow B), a protocol type=a user datagram protocol (UDP), a port number=32, and a destination address=IP#4 are discarded in the measurement time period.

Here, if it is assumed that a threshold value of the number of discarded packets is "1000", the number of discarded packets of the flow A exceeds the threshold value in the example of FIG. 9. Note that the threshold value of the number of discarded packets may be exemplarily arbitrarily set or changed by an administrator of the FW system 1. The number of discarded packets is an example of an indicator of a data amount discarded in the corresponding FW 5.

The FWC 7 may set, for the transmission source FW #1 of the flow A, a flow entry (may be conveniently called a "discarding entry" or a "FW entry") for discarding packets of the flow A in which the number of discarded packets thereof exceeds the threshold value.

The FWC 7 identifies, for example, the FW #1 corresponding to the sub-network #1 including the transmission source address="IP#1" of the flow A. In addition, the FWC 7 additionally sets, for the relevant FW #1, a discarding entry for discarding packets each having a transmission source address=IP#1, a destination address=IP#4, a protocol type=TCP, and a port number=56. The already-described entry setting request message (see FIG. 2) may be used for the additional setting of the discarding entry for the FW #1.

Note that the totalization of the discarded-packet information may be implemented by the FWC 7 or may be implemented by each of the FWs #x. In addition, analysis processing of a totalization result may be implemented by the FWC 7 or may be implemented by each of the FWs #x.

The analysis processing may exemplarily include threshold value determination processing of the discarded-packet information and generation processing of discarding entry information, based on a result of the relevant threshold value determination processing. One or two of the threshold value determination processing and the generation processing of the discarding entry information may be implemented by one of the FWC 7 and the FWs #x.

In a case where the totalization of the discarded-packet information is implemented by the FWC 7, the FWC 7 receives and collects, from each of the FWs #x, the discarded-packet information collected by the relevant FW #x. Each of the FWs #x may regularly or irregularly address, to the FWC 7, and transmit the collected discarded-packet information, for example. In response to the transmission of the discarded-packet information, the relevant FW #x may delete the collected discarded-packet information.

On the other hand, in a case where the totalization of the discarded-packet information is implemented by the FW #x, the FW #x may address, to the FWC 7, and transmit a totalization result or an analysis processing result of the relevant totalization result. In response to the transmission of the totalization result or the analysis processing result, the FW #x may delete information used for the totalization result or the analysis processing.

Hereinafter, an example in which the totalization of the discarded-packet information and the analysis processing are implemented by the FWC 7 will be described with reference to FIG. 10, and an example in which the totalization of the discarded-packet information and the analysis processing are implemented by each of the FWs #x will be described with reference to FIG. 11.

(Examples of Totalization and Analysis Processing in FWC)

Figure 10:
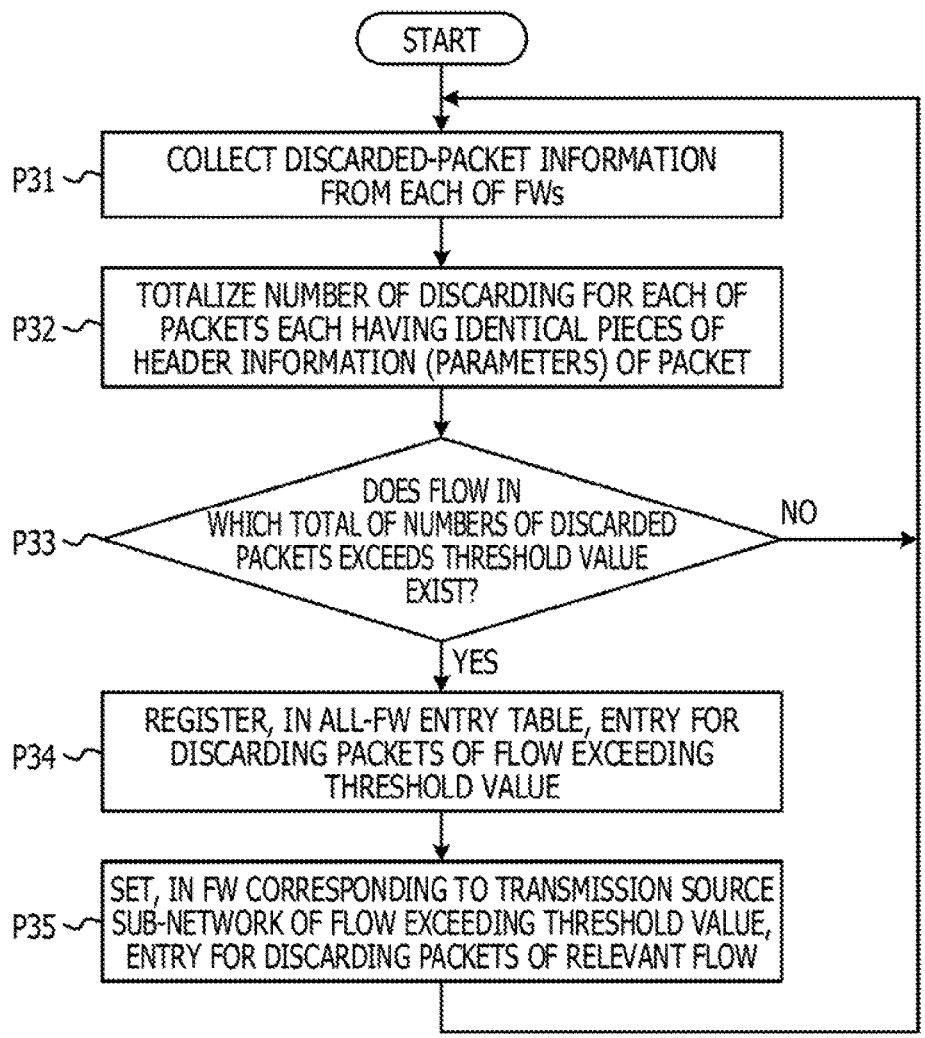
FIG. 10 is a flowchart for explaining an example in which the FWC exemplified in FIG. 1 implements totalization and analysis processing of the discarded-packet information.

As exemplified in FIG. 10, the FWC 7 receives and collects the discarded-packet information transmitted by each of the FWs 5 (processing operation P31) and stores the discarded-packet information in the storage unit 73 (see FIG. 1 and FIG. 8). Since storing the discarded-packet information, the relevant storage unit 73 may be conveniently called a "discarded-packet information storage unit 73".

As exemplified in FIG. 9, the FWC 7 may totalize the discarded-packet information stored in the discarded-packet information storage unit 73 for each of packets each having an identical transmission source address, an identical destination address, an identical protocol type, and an identical port number (processing operation P32).

In addition, the FWC 7 checks whether or not a flow in which the number of discarded packets exceeds the threshold value (1000 packets in an example of FIG. 9) exists in a totalization result (processing operation P33). For ease in the relevant check, the FWC 7 may sort the totalization result in descending order of, for example, the number of discarded packets.

If, as a result of the check, no flow in which the number of discarded packets exceeds the threshold value exists (processing operation P33: NO), the FWC 7 may shift the processing to the processing operation P31.

If the flow in which the number of discarded packets exceeds the threshold value exists (processing operation P33: YES), the FWC 7 obtains a discarding entry for discarding packets of the relevant flow and registers the discarding entry in the all-FW entry table 721 (processing operation P34).

In addition, the FWC 7 sets the obtained discarding entry, for the FW #x corresponding to the transmission source sub-network 3 of the flow in which the number of discarded packets exceeds the threshold value (processing operation P35).

As already described, the FWC 7 may set the information of the discarding entry in, for example, an entry setting request message and may address, to the FW #x serving as a target, and transmit the entry setting request message.

In the examples of FIG. 8 and FIG. 9, in the FW #4, the number of discarded packets of the flow A from the transmission source address="IP#1" exceeds the threshold value (1000 packets).

Therefore, the FWC 7 identifies, as a discarding entry setting target, the FW #1 corresponding to the transmission source sub-network #1 including the transmission source address="IP#1". The identification of the transmission source FW #1 may be performed based on, for example, the FW configuration information 741 described in FIG. 7.

In addition, the FWC 7 addresses, to the identified transmission source FW #1, and transmits the entry setting request message including the information of the discarding entry received from the reception FW #4 of the flow A.

If the relevant entry setting request message is received by the transmission source FW #1 and the discarding entry is registered in the entry table 54 in the FW #1, packets of the flow A are discarded by the FW #1 after that.

(Examples of Totalization and Analysis Processing in FW)

Figure 11:
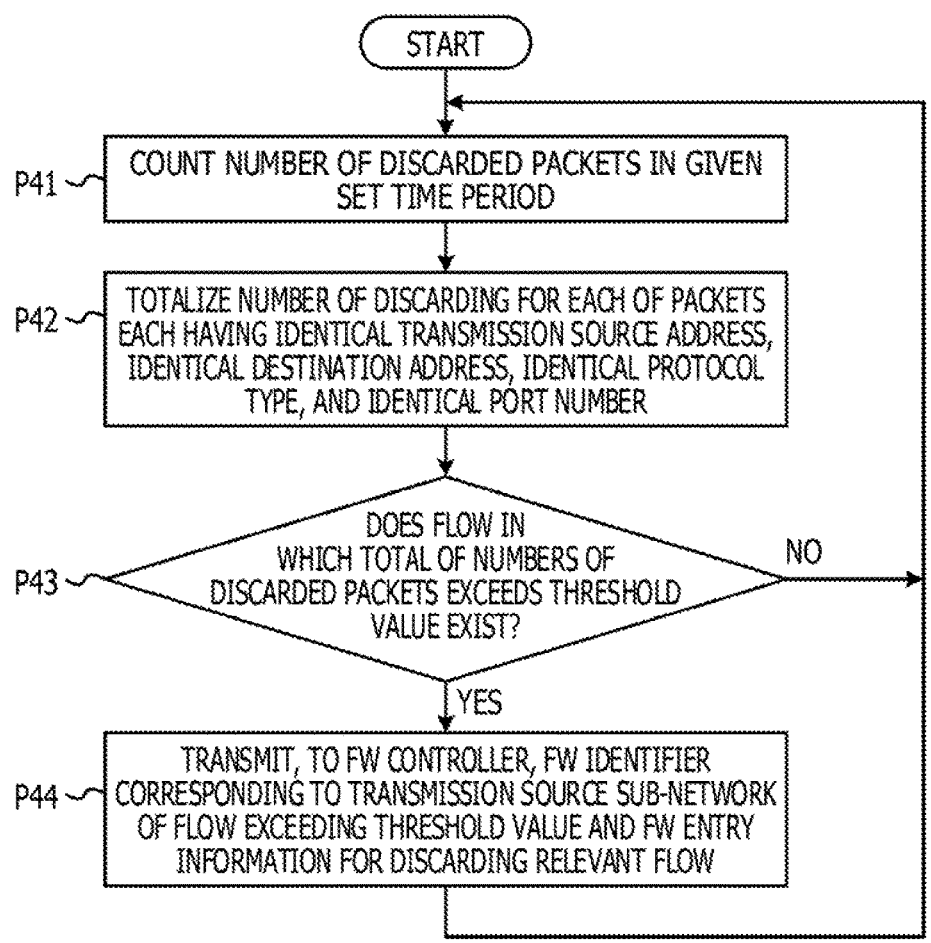
FIG. 11 is a flowchart for explaining an example in which a FW exemplified in FIG. 1 implements totalization and analysis processing of the discarded-packet information.

On the other hand, in a case where the totalization of the discarded-packet information and the analysis processing are implemented by each of the FWs #x, each of the FWs #x collects the discarded-packet information in the measurement time period as exemplified in FIG. 11 (processing operation P41).

In addition, each of the FWs #x performs totalization for each combination of a transmission source address, a destination address, a protocol type, and a port number of a discarded packet as exemplified in FIG. 9 (processing operation P42).

Each of the FWs #x checks whether or not a flow in which the number of discarded packets exceeds the threshold value exists in a totalization result (processing operation P43), and in a case of the absence thereof (processing operation P43: NO), the relevant FW #x may shift the processing to the processing operation P41.

If the flow in which the number of discarded packets exceeds the threshold value exists (processing operation P43: YES), each of the FWs #x may obtain a discarding entry for discarding packets of the relevant flow and may request the FWC 7 to set the relevant discarding entry (processing operation P44). The already-described entry setting request message may be used for the setting request for the relevant discarding entry.

In the examples of FIG. 8 and FIG. 9, in the FW #4, the number of discarded packets of the flow A from the transmission source address="IP#1" exceeds the threshold value (1000 packets).

Therefore, the FW #4 may cause the transmission source address, the destination address, the protocol type, and the port number of the flow A to be included in an entry setting request message and may address, to the FWC 7, and transmit the entry setting request message (processing operation P44).

Note that in response to the transmission of the entry setting request message, the FW #4 may delete the discarded-packet information and the totalization result. Therefore, it is possible to reduce a capacity prepared by the FW #x for storing the discarded-packet information and the totalization result.

Upon receiving the entry setting request message from the FW #4, the FWC 7 identifies the transmission source FW #1 serving as a discarding entry setting target, based on a transmission source address of discarded packets, included in the relevant message. The identification of the transmission source FW #1 may be performed based on the FW configuration information 741, as described in, for example, FIG. 7.

In addition, the FWC 7 addresses, to the identified transmission source FW #1, and transmits an entry setting request message including the information of the discarding entry received from the reception FW #4 of the flow A.

If the relevant entry setting request message is received by the transmission source FW #1 and the discarding entry is registered in the entry table 54 in the FW #1, packets of the flow A are discarded by the FW #1 after that.

As described above, the packets of the flow A, in which the number of discarding thereof exceeds the threshold value in the FW #4, are able to be discarded by the FW #1 corresponding to the transmission source sub-network #1 of the relevant flow A. Therefore, it is possible to inhibit undesired packets from flowing through the core network 2.

In addition, by setting the threshold value, it is possible to reliably detect a flow in which a traffic reduction effect in the core network 2 is high. Therefore, it is possible to obtain a great traffic reduction effect while suppressing the number of discarding entries set in the transmission source FW 5.

Note that one or both of the transmission source address and the destination address used as keys for the totalization of the discarded-packet information may be addresses of communication devices or may be network addresses of the sub-networks 3 to which the respective relevant communication devices belong. The "communication device" may be called a "communication node" or may be simply called a "node".

In the totalization result of the discarded-packet information, the FWC 7 may determine whether or not a destination address is included in a subnet address for each of all element packets of a flow in which the number of discarded packets thereof exceeds the threshold value.

In addition, in a case where, in the totalization result, the percentage of the number of discarded packets regarding a destination address included in a subnet address exceeds a threshold value, the FWC 7 may obtain a discarding entry for discarding packets of a flow whose "destination address" is the relevant subnet address. In the relevant discarding entry, parameters other than the "destination address", for example, a transmission source address, a protocol type, and a port number, may be parameters used for the totalization of the discarded-packet information.

(First Example of Modification)

Next, a first example of a modification will be described with reference to FIG. 12 to FIG. 15.

Figure 12:
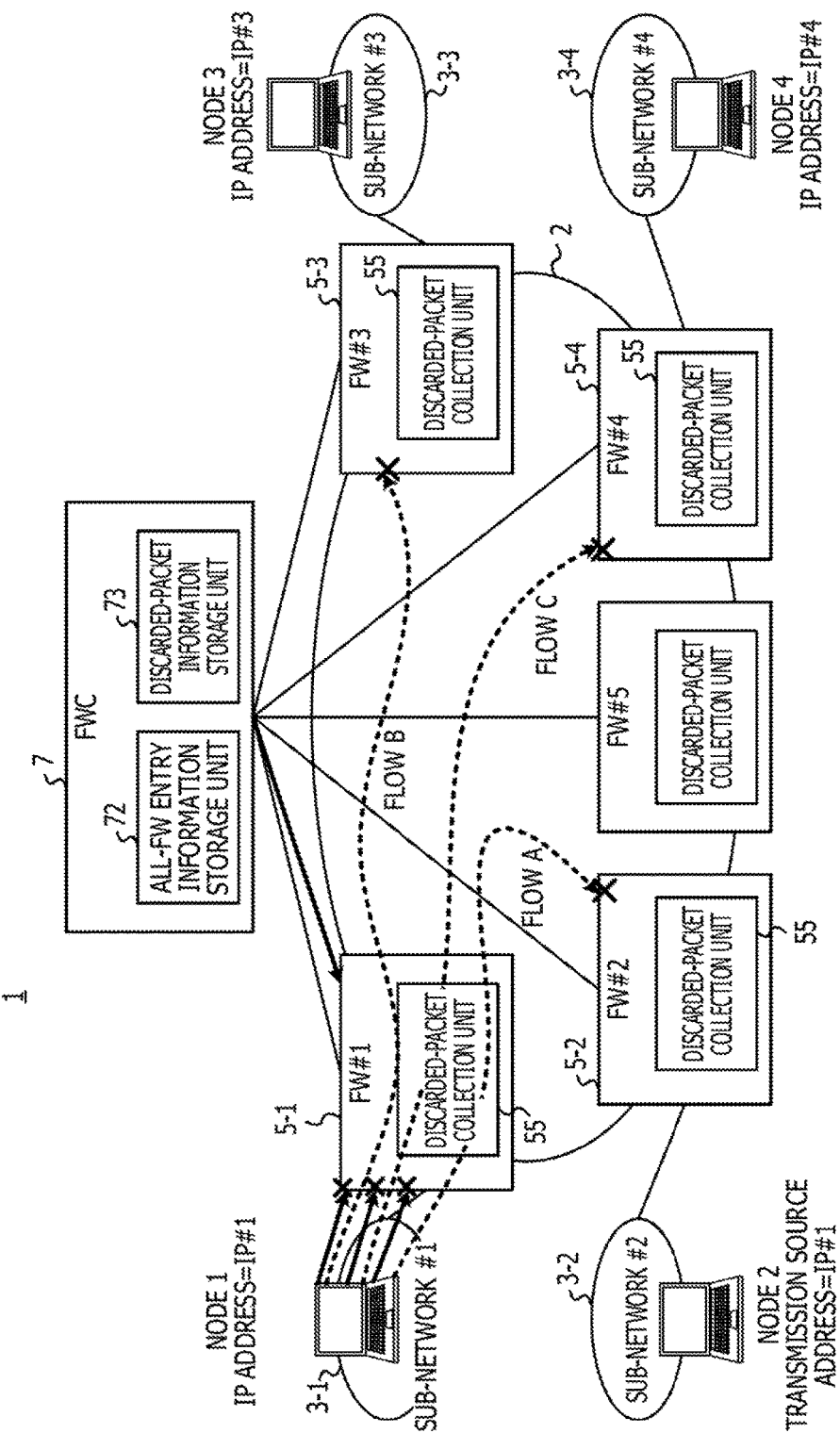
FIG. 12 is a diagram for explaining a first example of a modification to an embodiment.
Figure 13:
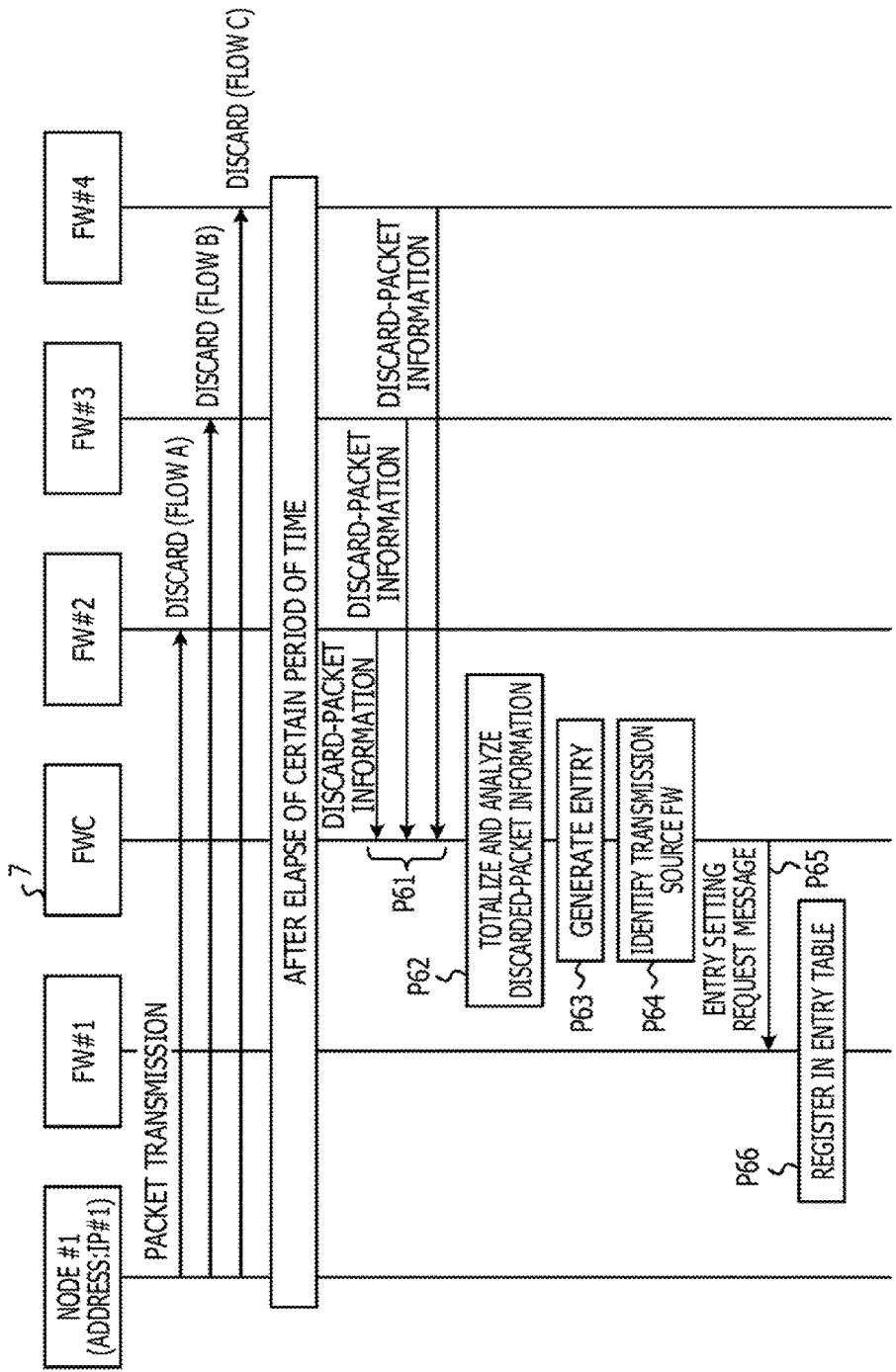
FIG. 13 is a sequence diagram for explaining an example of an operation of the first example of a modification.

As exemplified in FIG. 12 and FIG. 13, it is assumed that, at a point of time, flows A to C flow from the node #1 belonging to the sub-network #1 while being addressed to the nodes #2 to #4 belonging to the sub-networks #2 to #4, respectively. In addition, it is assumed that packets of these flows A to C are discarded by the FW #2 to FW #4 in accordance with flow entries set in the entry tables 54 in the FWs #2 to #4, respectively.

In the same way as in the above-mentioned embodiment, the FWs #2 to #4 collect pieces of information (discarded-packet information) of packets discarded in accordance with the flow entries, for the flows A to C, respectively, in a measurement time period.

The FWs #2 to #4 each address, to the FWC 7, and transmit the collected discarded-packet information (processing operation P61 in FIG. 13). Based on the pieces of discarded-packet information received from the respective FWs #2 to #4, the FWC 7 totalizes the number of discarded packets for each combination of a transmission source address, a protocol type, a port number (processing operation P62 in FIG. 13).

An example of a totalization result is illustrated in FIG. 14. In the example of FIG. 14, destination addresses are "IP#2", "IP#3", and "IP#4" of the respective different flows A to C. However, since the transmission source addresses are equal to "IP#1", the numbers of discarded packets of the 3 flows A to C are totalized.

As a non-restrictive example, it is assumed that the number of discarded packets of the flow A in the FW #2 is "356", the number of discarded packets of the flow B in the FW #3 is "423", and the number of discarded packets of the flow C in the FW #4 is "389". In this case, the total of the numbers of discarded packets of the 3 flows is "1168".

In the already-described embodiment, in, for example, the processing operation P32 in FIG. 10, the discarded-packet information is totalized for each of packets each having an identical transmission source address, an identical protocol type, an identical port number, and an identical destination address.

In contrast, in the first example of a modification, in, for example, the processing operation P32 in FIG. 10, the FWC 7 may set, as a wild card (*), the "destination address" out of the transmission source address, the protocol type, the port number, and the destination address, thereby totalizing the discarded-packet information.

It may be thought that setting the "destination address" as the wild card corresponds to not specifying the "destination address" as a key of the totalization. From this, regardless of whether the "destination address" is different or identical, if parameters of the transmission source address, the protocol type, and the port number are identical, the number of discarded packets each having the relevant parameters turns out to be totalized.

Here, it is assumed that a threshold value of the number of discarded packets is set to "1000" packets in the same way as in the already-described embodiment. In this case, in an example of FIG. 14, the number of discarded packets each having the transmission source address=IP#1, the protocol type=UDP, and the port number=35 is "1168" packets and exceeds "1000" packets.

Regarding the flows A to C each having the same transmission source address, the numbers of packets discarded by the respective FW #2 to FW #4 are "356" (FW #2), "423" (FW #3), and "389" (FW #4) and each fall below the threshold value of "1000" packets.

Therefore, in the totalization method exemplified in FIG. 9, none of the flows A to C is a setting candidate of a discarding entry. In contrast, according to the totalization method exemplified in FIG. 14, the numbers of discarded packets of different flows each having the same transmission source address are totalized. Therefore, the FWC 7 is able to detect flows of a "distributed target type" such as distributing from a same transmission source address to destination addresses (processing operation P62 in FIG. 13).

In a flow of the "distributed target type", even if the number of packets discarded in each of the FW #2, the FW #3, and the FW #4 is small, packets corresponding to the total number of packets discarded in the individual FWs #2 to #4 flow in the entire core network 2.

According to the first example of a modification, it is possible to reliably detect flows of such a "distributed target type". The FWC 7 generates a discarding entry for discarding packets of a detected flow of the "distributed target type" (processing operation P63 in FIG. 13). In the example of FIG. 14, the FWC 7 generates a discarding entry for discarding entry packets each having the transmission source address=IP#1, the protocol type=UDP, and the port number=35. The relevant discarding entry exemplarily corresponds to a flow entry having the entry number=2, illustrated in FIG. 15.

In addition, based on, for example, the transmission source address=IP#1 of packets of the detected flow of the "distributed target type", the FWC 7 identifies the transmission source sub-network #1 and identifies the transmission source FW #1 corresponding to the identified sub-network #1 (processing operation P64 in FIG. 13).

In addition, for the identified transmission source FW #1, the FWC 7 sets the generated discarding entry (processing operation P65 in FIG. 13). The already-described entry setting request message may be used for the setting of the discarding entry.

The FW #1 sets and registers, in the entry table 54, the discarding entry included in the entry setting request message received from the FWC 7 (processing operation P66 in FIG. 13).

From this, it is possible to inhibit packets of flows of the "distributed target type" from flowing through the core network 2 as exemplified by dotted lines in FIG. 12. Accordingly, it is possible to inhibit a transmission band of the core network 2 from being wasted by the undesired packets.

Note that before transmitting the entry setting request message addressed to the FW #1, the FWC 7 may reference the all-FW entry table 721, thereby checking whether or not an existing entry to compete with the discarding entry to be set in the FW #1 exists.

In the example of, for example, FIG. 12, it is assumed that a flow entry for permitting transfer of a packet having the protocol type=UDP and the port number=35 is already set for one of the FWs #5, coupled to a sub-network #5.

In this case, a packet having the protocol type=UDP and the port number=35 may be permitted to be transferred by the node #1 to the sub-network #5. Therefore, the FWC 7 may additionally set, for the FW #1, a flow entry for permitting transfer of the relevant packet.

An example of a flow entry to be set in the FW #1 is illustrated in FIG. 15. FIG. 15 illustrates an example of information focused on a flow entry to be set in the FW #1, included in flow entries registered in the all-FW entry table 721.

Flow entries are exemplarily sequentially referenced starting from an upper entry whose entry number is smaller. Therefore, as exemplified in FIG. 15, the flow entry for permitting transfer of a packet having the protocol type=UDP and the port number=35 is additionally set so as to be ranked higher (for example, the entry number=1) than the already-described discarding entry having the entry number=2.

The flow entries that have the respective entry numbers=1 and 2 and that are exemplified in FIG. 15 are set in the FW #1. Accordingly, a packet having the transmission source address=IP#1 and the destination address to serve as the address of the sub-network #5 is permitted to pass through the FW #1, based on the flow entry whose entry number=1.

A packet having the same transmission source address "IP#1" and another destination address is discarded by the FW #1, based on the flow entry whose entry number=2. From this, the flows A to C of the "distributed target type" to destination addresses different from the address of the sub-network #5 are blocked by the FW #1.

In this way, in response to detection of an existing entry to compete with a discarding entry to be newly set for the FW #x, the FWC 7 modifies and sets a discarding entry in the FW #x. Therefore, it is possible to avoid erroneous blocking of a flow that may be permitted to pass.

(Second Example of Modification)

There is an upper limit to the number of flow entries permitted to be set in the FW #x. Therefore, it is best not to add, without reason, entries for discarding undesired traffics. In a second example of a modification, an example in which the number of flow entries to be set for the transmission source FW #x is reduced compared with the already-described embodiment and the first example of a modification will be described.

Figure 16:
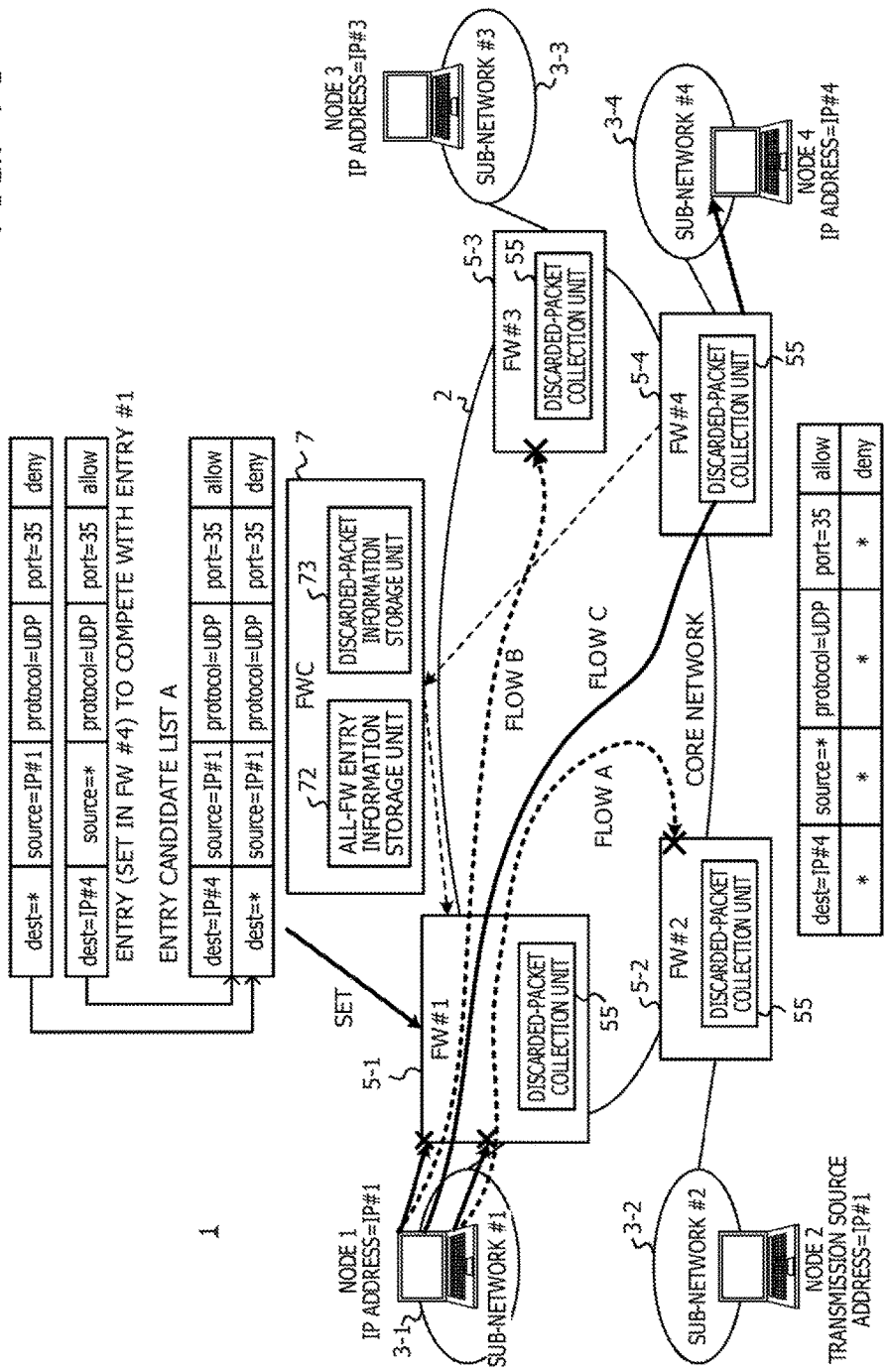
FIG. 16 is a diagram for explaining a second example of a modification to an embodiment.

As illustrated in, for example, FIG. 16, it is assumed that flows A to C each having a UDP port number=35 flow from the node #1 belonging to the sub-network #1 through the core network 2 while being addressed to the nodes #2 to #4 belonging to the sub-networks #2 to #4, respectively.

In addition, it is assumed that packets of the flow A addressed to the node #2 are discarded by the FW #2, packets of the flow B addressed to the node #3 are discarded by the FW #3, and packets of the flow C addressed to the node #4 are permitted to pass through the FW #4.

Figure 18:
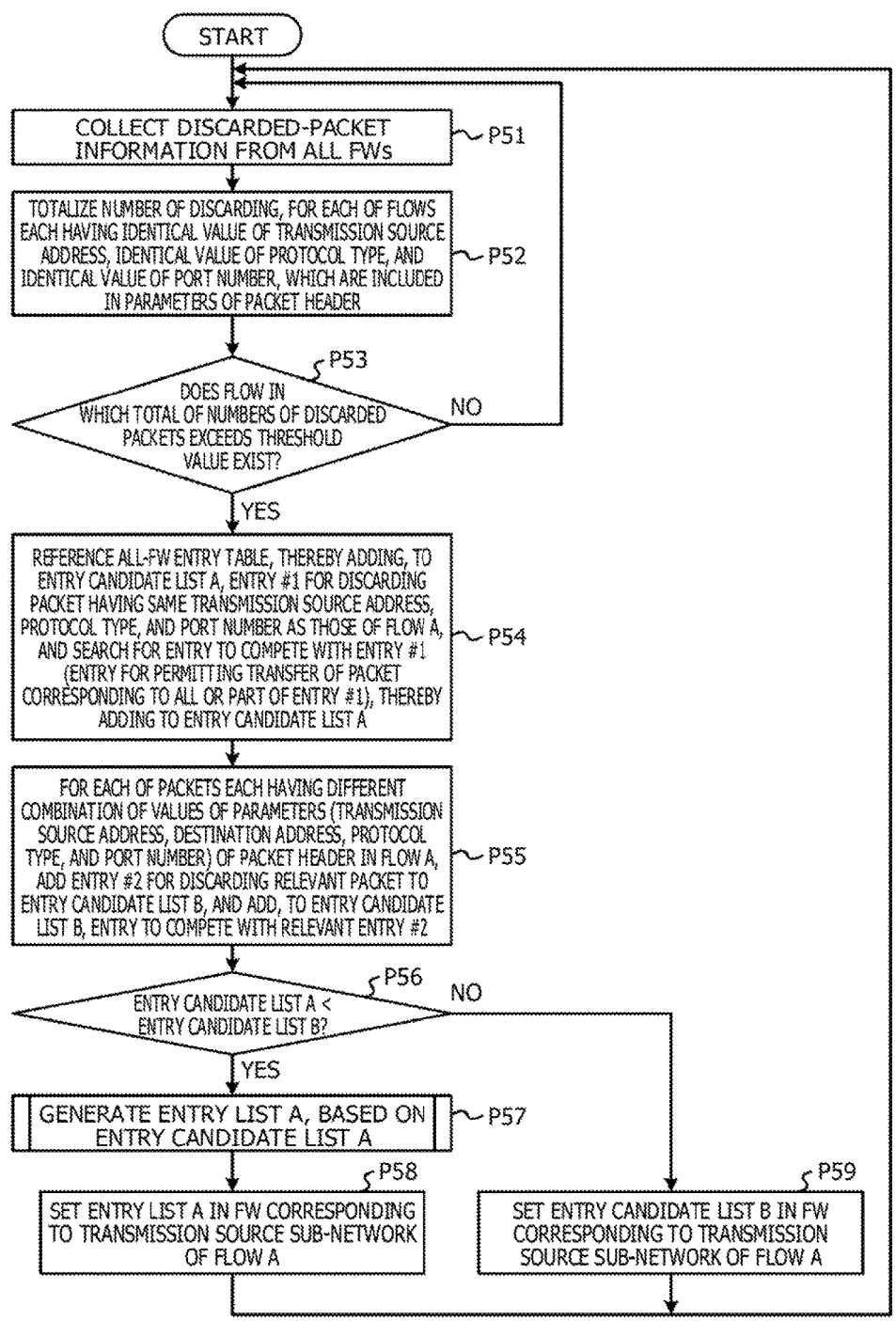
FIG. 18 is a flowchart for explaining an example of an operation of the FWC in the second example of a modification.

The FWC 7 may collect the discarded-packet information of each of the FWs #1 to #4 (processing operation P51 in FIG. 18). In addition, the FWC 7 may exemplarily totalize the collected discarded-packet information, for each of packets each having an identical combination of a transmission source address and arbitrary parameters out of a destination address, a protocol type, and a port number (processing operation P52 in FIG. 18).

Figure 17:
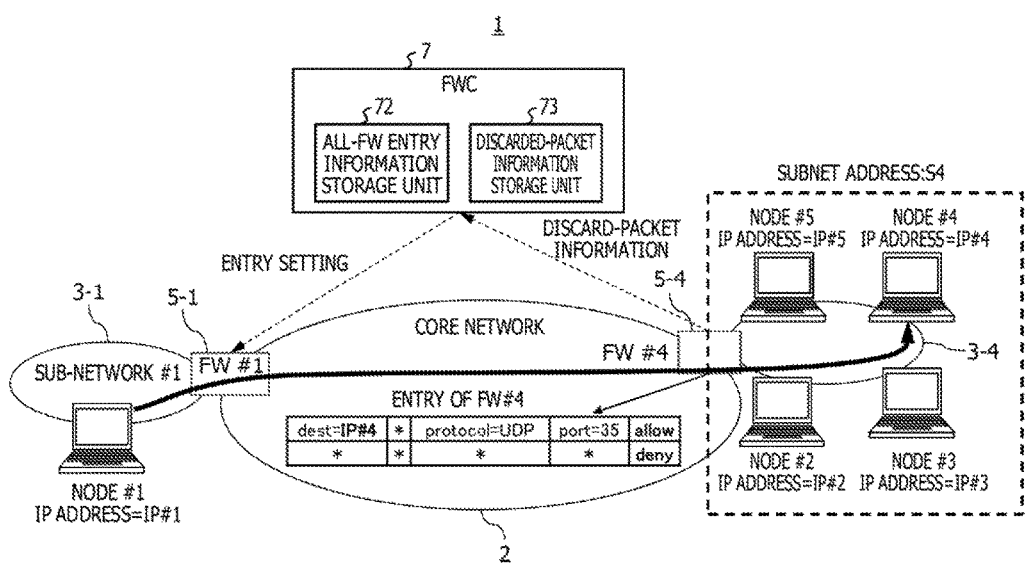
FIG. 17 is a diagram for explaining that a sub-network address is allowed to be specified as a destination address in the second example of a modification.

Note that parameters of packet headers used for the totalization may be set and changed by an administrator of the FW system 1. In addition, one or both of the transmission source address and the destination address used as keys for the totalization may be addresses of nodes or may be an address of the sub-network 3 to which the relevant nodes belong (for example, a subnet address=S4 in FIG. 17).

An example of a totalization result based on the processing operation P52 is illustrated in FIG. 20. In the example of FIG. 20, the numbers of discarded packets that each having the transmission source address=IP#1, the protocol type=UDP, and the port number=35 and that are included in the respective flows A and B are totalized. In addition, the threshold value of the number of discarded packets is set to "1000" packets.

The FWC 7 checks whether or not a flow in which the total number of discarded packets exceeds the threshold value exists in a totalization result (processing operation P53 in FIG. 18). If no flow exceeding the threshold value exists (processing operation P53: NO), the FWC 7 may shift the processing to the processing operation P51.

If a flow exceeding the threshold value exists (processing operation P53: YES), the FWC 7 may generate an entry candidate list A (processing operation P54 in FIG. 18). In the example of FIG. 20, the total of the numbers of discarded packets of the respective flows A and B is "1168" packet and exceeds the threshold value of "1000" packets. Therefore, the FWC 7 may generate the entry candidate list A.

The FWC 7 may reference, for example, the all-FW entry table 721 and may register, in the entry candidate list A, an entry #1 for discarding a packet having the same transmission source address, protocol type, and port number as those of the flow A (the same applies to the flow B) (processing operation P54 in FIG. 18).

In other words, the FWC 7 may set the destination address as the wild card (*), may search, within the table 721, for the entry #1 for discarding a packet having the transmission source address=IP#1, the protocol type=UDP, and the port number=35, and may add the entry #1 to the entry candidate list A.

In the example of FIG. 16, if the destination address is used as the wild card, 2 entries of an entry for discarding the flow A in the FW #2 and an entry for discarding the flow B in the FW #3 are aggregated into 1 discarding entry #1, thereby being registered in the entry candidate list A. If, in, for example, the totalization result in FIG. 20, the destination address is used as the wild card, 2 discarding entries #1 having the respective different destination addresses (IP#2 and IP#3) are aggregated into 1 entry.

In addition, within the all-FW entry table 721, the FWC 7 may search for an entry to compete with the discarding entry #1, for example, an entry for permitting transfer of a packet corresponding to all or part of the discarding entry #1. If, in the relevant search, a competing entry is hit, the FWC 7 may exemplarily register the relevant entry in the entry candidate list A in order to generate a flow entry for resolving or avoiding the competition (processing operation P54 in FIG. 18).

In the example of FIG. 16, an entry, which is set in the FW #4 and which permits transfer of a packet having the destination address=IP#4, the transmission source address=*, the protocol type=UDP, and the port number=35, corresponds to an entry to compete with the discarding entry #1.

Accordingly, in the example of FIG. 16, 2 entries in total of the 1 discarding entry #1 and an entry to compete with the discarding entry #1 are registered in the entry candidate list A, as illustrated in, for example, FIG. 21A.

In addition, for each of packets each having a different value of a parameter of a packet header in the flow A, the FWC 7 may register an entry #2 for discarding the relevant packet, in the entry candidate list B (processing operation P55 in FIG. 18).

For, for example, each of packets each having a different transmission source address, a different destination address, a different protocol type, or a different port number, the entry #2 for discarding the relevant packet may be registered in the entry candidate list B.

In other words, in the processing operation P55 in FIG. 18, the FWC 7 does not set the destination address as the wild card. If the destination address is not set as the wild card, the discarding entry #2 turns out to be obtained for each of different destination addresses.

In a case of the totalization result in, for example, FIG. 20, 2 discarding entries #2 for discarding packets each having the identical transmission source address=IP#1, the identical protocol type=UDP, and the identical port number=35 are obtained for the respective 2 destination addresses (IP#2 and IP#3).

Furthermore, within the all-FW entry table 721, the FWC 7 searches for an entry to compete with the corresponding discarding entry #2, for example, an entry for permitting transfer of a packet corresponding to all or part of the corresponding discarding entry #2. If, in the relevant search, a competing entry is hit, the FWC 7 exemplarily adds the relevant entry to the entry candidate list B in order to generate an entry list for resolving or avoiding the competition (processing operation P55 in FIG. 18).

In the example of FIG. 16, as illustrated in, for example, FIG. 21B, 3 entries of 2 discarding entries #2 for discarding the respective flows A and B and 1 entry that competes with the discarding entries #2 and that is set in the FW #4 are registered in the entry candidate list B.

The FWC 7 compares the number of entries of the entry candidate list A with the number of entries of the entry candidate list B, thereby performing size determination (processing operation P56 in FIG. 18).

If the number of entries of the entry candidate list A is smaller than the number of entries of the entry candidate list B (processing operation P56 in FIG. 18: YES), the FWC 7 may generate the entry list A, based on the entry candidate list A (processing operation P57 in FIG. 18). The entry list A is exemplarily a list of flow entries to be set in the FW #1 corresponding to the transmission source sub-network #1 of the flow A (and the flow B).

In the example of FIG. 16, as exemplified in FIG. 21A and FIG. 21B, the number of entries of the entry candidate list A is "2", whereas the number of entries of the entry candidate list B is "3". Therefore, YES is determined in the processing operation P56.

Figure 19:
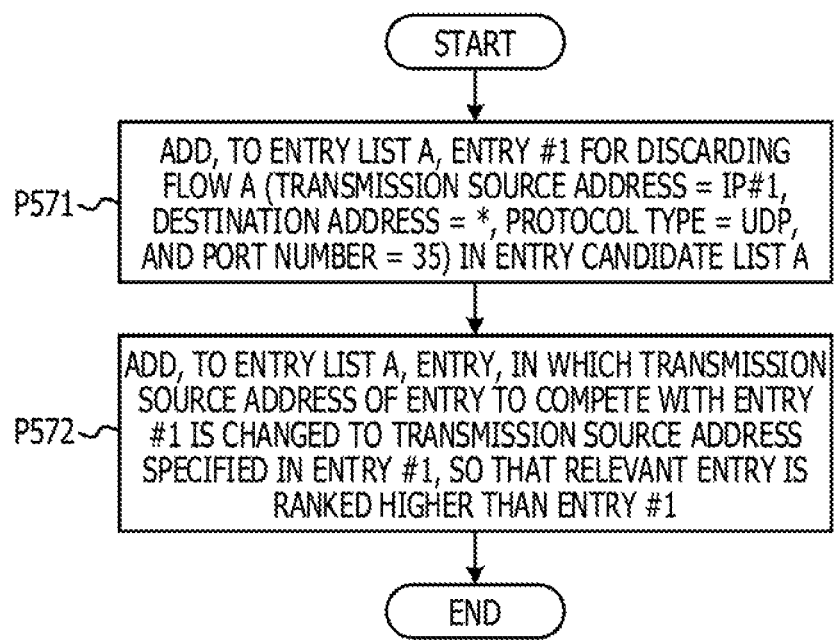
FIG. 19 is a flowchart for explaining generation processing of an entry list exemplified in FIG. 18.

An example of processing for generating the entry list A, based on the entry candidate list A, is illustrated in FIG. 19. As exemplified in FIG. 19, the FWC 7 registers, in the entry list A, the entry #1 for discarding the flow A (and the flow B) (the transmission source address=IP#1, the destination address=*, the protocol type=UDP, and the port number=35) (processing operation P571).

In addition, the FWC 7 adds and registers, in the entry list A, an entry, in which a transmission source address of an entry to compete with the entry #1 is changed to a transmission source address specified in the entry #1, so that the entry is ranked higher than the entry #1 (processing operation P572).

In the example of FIG. 16, as illustrated in, for example, FIG. 21C, an entry, in which a transmission source address=* of a competing entry is changed to the transmission source address=IP#1 of the discarding entry #1 and which permits packet transfer of the flow C, is registered so as to be ranked higher in the entry list A.

In addition, the FWC 7 sets the entry list A in the transmission source FW #1 corresponding to the transmission source sub-network #1 of the flow A (and the flow B) (processing operation P58 in FIG. 18). The already-described entry setting request message (see FIG. 2) may be used for the setting of the entry list A.

From this, in the FW #1, the entry list A exemplified in FIG. 21C is set and registered in the entry table 54. As a result, in the example of FIG. 16, packets of the flows A and B out of the flows A to C are discarded by the FW #1, and packets of the flow C out thereof pass through the FWs #1 and #4 and are transferred to the node #4 belonging to the sub-network #4.

Note that if the number of entries of the entry candidate list A is greater than or equal to the number of entries of the entry candidate list B in the processing operation P56 in FIG. 18 (NO), the FWC 7 may set the entry candidate list B in the transmission source FW #1 of the flow A (and the flow B) (processing operation P59 in FIG. 18).

As described above, according to the second example of a modification, it is possible to obtain the same function effect as that of the already-described embodiment or the first example of a modification, and furthermore, it is possible to aggregate discarding entries, thereby setting, in the transmission source FW #x, an entry list in which the number of entries is smaller.

Accordingly, it is possible to suppress the number of flow entries set in FW #x, thereby reducing a storage capacity prepared in the FW #x for storing the entry table 54.

(Third Example of Modification)

Next, "auto-scaling" in which the number of the FWs 5 is changed in accordance with a processing load of one of the FWs 5 will be described. Note that the FWs 5 in a third example of a modification may be exemplarily VMs.

If detecting an increase in a processing load, one of the FWs 5 may exemplarily address, to the FWC 7, and transmit a control message such as an alarm message indicating an increase in the processing load.

In a case where a traffic amount transferred to one of the FWs 5 exceeds a threshold value, for example, in a case where the number of packets received per unit time period by the relevant FW 5 exceeds a threshold value, an increase in the processing load of the relevant FW 5 may be exemplarily detected.

Alternatively or additionally, an increase in the processing load of the relevant FW 5 may be exemplarily detected in a case where the usage rate or memory usage rate of an arithmetic device such as a CPU mounted in the relevant FW 5 exceeds a threshold value. Note that the term CPU is an abbreviation of a "central processing unit".

Upon receiving the alarm message form the corresponding FW 5, the FWC 7 may generate 1 or more additional FWs 5 and load distribution functions, as, for example, VMs.

Figure 22:
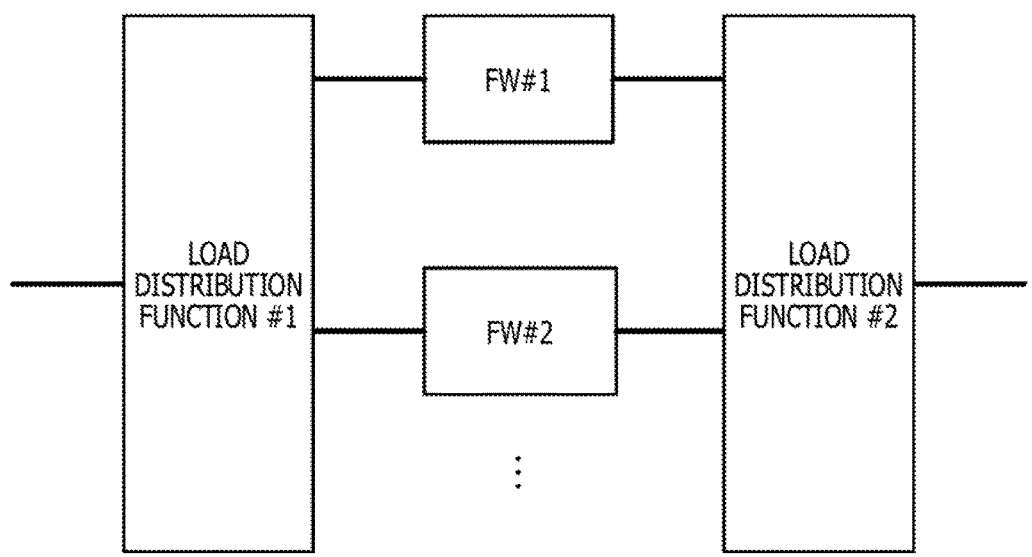
FIG. 22 is a pattern diagram for explaining auto-scaling according to a third example of a modification to an embodiment.

Upon receiving the alarm message from, for example, the FW #1, the FWC 7 may generate 1 or more additional FW #m ("m" is an integer greater than or equal to 2) and load distribution functions #1 and #2, as VMs, as schematically illustrated in FIG. 22.

The FWs 5 including the additional FWs #m may be exemplarily coupled in parallel to the load distribution functions #1 and #2 between the load distribution functions #1 and #2. Note that the FWs 5 coupled in parallel to the load distribution functions #1 and #2 may be conveniently called "parallel FWs" 5.

The first load distribution function #1 exemplarily sorts reception packets into the FWs 5 including the additional FWs #m.

In addition, the second load distribution function #2 receives packets transmitted in a direction opposite to that of packets input to the first load distribution function #1 and sorts the reception packets into the FWs 5 including the additional FWs #m.

In the entry table 54 in each of the additional FWs #m, flow entries having the same contents as those of the entry table 54 in the FW #1 that transmits the alarm message may be set.

From this, packets input to one of the load distribution functions #1 and #2 are sorted into the parallel FWs 5 each having the same entry table 54. Therefore, it is possible to realize the load distribution of the FWs 5.

Note that addresses assigned to the FWs 5 and load distribution functions added by the auto-scaling may be set in a form of not influencing an existing address setting in the FW system 1.

(Fourth Example of Modification)

The auto-scaling of the FWs 5 is not limited to the above-mentioned processing load and may be implemented in a case where the number of entries in the corresponding entry table 54 exceeds a threshold value.

The FWC 7 may reference, for example, the all-FW entry table 721 and may determine whether the number of entries of flow entries set in the entry table 54 in one of the FWs 5 exceeds a threshold value. The threshold value of the number of entries may be set or changed by an administrator of the FW system 1.

Figure 23:
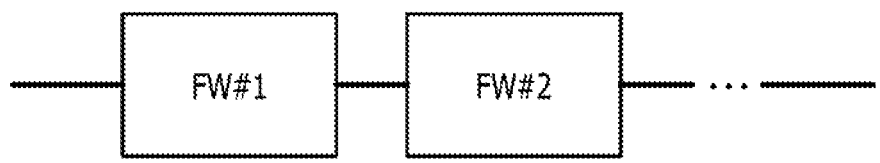
FIG. 23 is a pattern diagram for explaining auto-scaling according to a fourth example of a modification to an embodiment.

In a case where one of the FWs 5 having the number of entries exceeding the threshold value exists, the FWC 7 may generate the additional FWs #m. As schematically illustrated in, for example, FIG. 23, the additional FWs #m may be coupled in series to the FW #1 having the number of entries exceeding the threshold value. One of the FWs 5 coupled in series to another of the FWs 5 may be conveniently called a "series FW" 5.

Some of flow entries registered in the entry table 54 in the FW #1 having the number of entries exceeding the threshold value may be newly set and registered in the entry table 54 of each of the additional series FWs #m. In other words, flow entries may be dispersively set for the series FWs 5 including the additional FWs #m. Accordingly, the series FWs 5 including the additional FWs #m may include the entry tables 54 having respective contents different from one another.

In this way, in accordance with an increase in the number of flow entries, it is possible to increase the number of the FWs 5 and to dispersively set flow entries in the series FWs 5. Therefore, it is possible to reduce the size of the entry table 54 prepared for each one of the FWs 5. Accordingly, it is possible to reduce a storage capacity prepared for each one of the FWs 5.

(Fifth Example of Modification)

Note that the third example of a modification and the fourth example of a modification, described above, may be implemented in combination. As schematically illustrated in, for example, FIG. 24, the FWC 7 may additionally generate the parallel FWs 5 and the load distribution functions #1 and #2 in accordance with an increase in the processing load of one of the FWs 5 and may additionally generate the series FWs 5 in accordance with an increase in number of flow entries of one of the FWs 5.

From this, it is possible to obtain a combined function effect of the above-mentioned third example of a modification and fourth example of a modification, and it is possible to achieve processing load distribution of the FWs 5 and suppression of an entry table size (in other words, a storage capacity) for each one of the FWs 5.

(Example of Configuration of FW)

Figure 25:
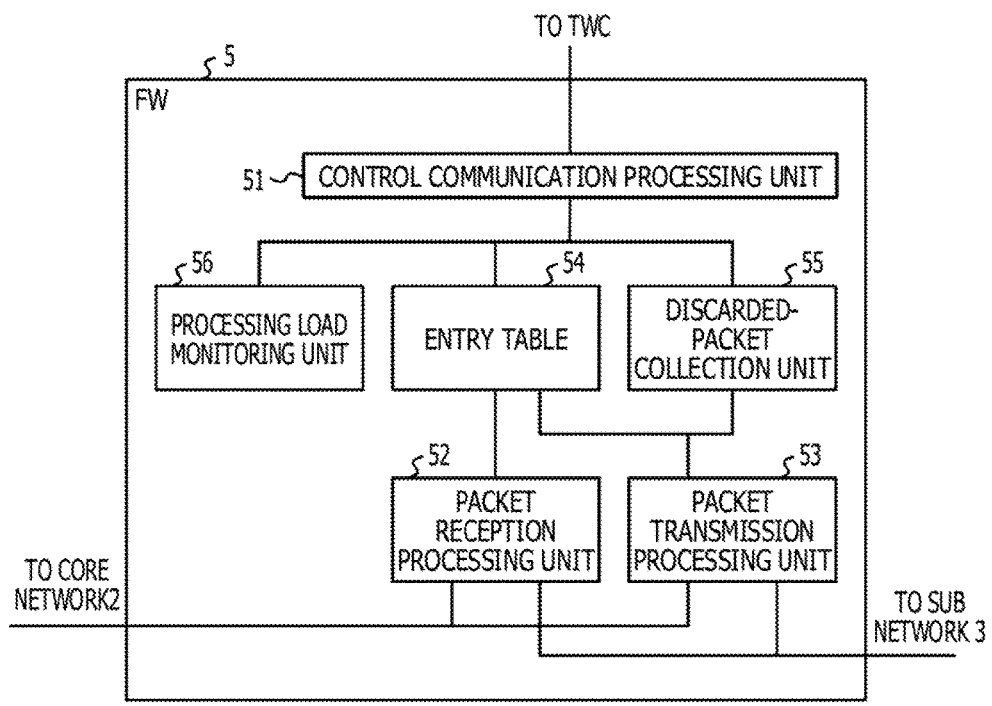
FIG. 25 is a block diagram illustrating an example of functional configurations of FWs in embodiments including the above-mentioned individual examples of a modification.

FIG. 25 is a block diagram illustrating an example of functional configurations of the FWs 5 in the embodiments including the individual above-mentioned examples of a modification.

As illustrated in FIG. 25, the FWs 5 may each exemplarily include a control communication processing unit 51, a packet reception processing unit 52, a packet transmission processing unit 53, an entry table 54, and a discarded-packet collection unit 55. In addition, the FWs 5 may each include a processing load monitoring unit 56.

The control communication processing unit 51 may exemplarily perform, with the FWC 7, communication (may be conveniently called "control communication") related to control of the relevant FW 5.

The control communication may exemplarily include addressing, to the FWC 7, and transmitting discarded-packet information collected by the discarded-packet collection unit 55 and a totalization result or an analysis result of the discarded-packet information. In addition, the control communication may include receiving, from the FWC 7, a control message such as an entry setting request message. Furthermore, the control communication may include addressing, to the FWC 7, and transmitting the already-described alarm message.

The control communication processing unit 51 is an example of a transmission unit if focusing on transmission processing, and the control communication processing unit 51 is an example of a reception unit if focusing on reception processing.

The packet reception processing unit 52 exemplarily has charge of processing for receiving packets from the core network 2 and the corresponding sub-network 3. In accordance with, for example, flow entries set in the entry table 54, the packet reception processing unit 52 may output, to the packet transmission processing unit 53, packets permitted to be transferred and may discard packets not permitted to be transferred.

The packet transmission processing unit 53 exemplarily has charge of processing of transmitting packets to the core network 2 and the corresponding sub-network 3. In accordance with, for example, flow entries set in the entry table 54, the packet transmission processing unit 53 transmits, to the core network 2 or the corresponding sub-network 3, packets transferred by the packet reception processing unit 52.

As described above, flow entries each indicating permission or rejection of packet transfer are registered in the entry table 54. The setting and registration of entries, performed on the entry table 54, may be exemplarily performed by the control communication processing unit 51.

The discarded-packet collection unit 55 may exemplarily collect information (discarded-packet information) of packets discarded by the packet reception processing unit 52. In addition, the discarded-packet collection unit 55 may totalize, based on parameters of packet headers, the collected pieces of discarded-packet information, as described above, and may further analyze a totalization result, thereby detecting a flow in which the number of discarded packets exceeds the threshold value.

As described in the already-described third example of a modification, the processing load monitoring unit 56 may exemplarily monitor the processing load of the corresponding FW 5, thereby detecting an increase in the load of the corresponding FW 5. In response to detection of an increase in a load, the already-described alarm message may be generated by the processing load monitoring unit 56 and may be addressed, to the FWC 7, and transmitted by the control communication processing unit 51.

(Example of Configuration of FWC)

Figure 26:
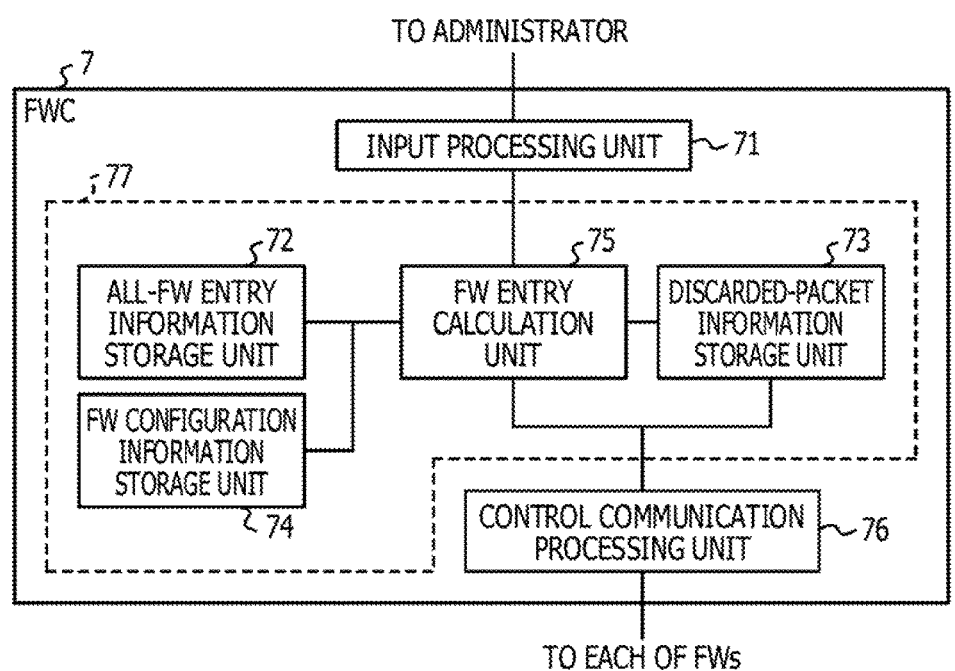
FIG. 26 is a block diagram illustrating an example of functional configurations of FWCs in embodiments including the above-mentioned individual examples of a modification.

FIG. 26 is a block diagram illustrating an example of functional configurations of the FWC 7 in the embodiments including the individual above-mentioned examples of a modification.

As illustrated in FIG. 26, the FWC 7 may exemplarily include an input processing unit 71, an all-FW entry information storage unit 72, a discarded-packet information storage unit 73, a FW configuration information storage unit 74, a FW entry calculation unit 75, and a control communication processing unit 76.

The input processing unit 71 exemplarily processes information input by an administrator of the FW system 1. The input information based on the administrator may include information of flow entries, a threshold value related to the number of discarded packets, a threshold value related to the number of flow entries, and the FW configuration information 741 (see FIG. 7).

The all-FW entry information storage unit 72 exemplarily stores therein the already-described all-FW entry table 721.

The discarded-packet information storage unit 73 exemplarily stores therein the discarded-packet information collected by each of the FWs 5 serving as targets of control and management based on the FWC 7. Along with the discarded-packet information or in place of the discarded-packet information, a totalization result or an analysis result of the discarded-packet information may be stored in the discarded-packet information storage unit 73.

The FW configuration information storage unit 74 exemplarily stores therein the already-described FW configuration information 741.

Based on pieces of storage information of the respective storage units 72 to 74, the FW entry calculation unit 75 calculates flow entries to be set in the transmission source FW 5. It may be thought that processing operations described in FIG. 10, FIG. 12 to FIG. 20, and FIG. 21A to FIG. 21C are exemplarily implemented by the relevant FW entry calculation unit 75.

It may be thought that the individual storage units 72 to 74 and the FW entry calculation unit 75 form an example of the control unit 77. As already described, based on the discarded-packet information, the control unit 77 is able to detect a data flow in which the discarded-data amount of the same transmission source information exceeds a threshold value. In addition, the control unit 77 is able to set a discarding entry for discarding the data of the detected data flow, in the transmission source FW 5 (for example, the FW #1) of the relevant data flow.

The control communication processing unit 76 exemplarily performs control communication with each of the FWs 5 serving as targets of management and control based on the FWC 7. The control communication may exemplarily include reception of the discarded-packet information and a totalization result or an analysis result of the discarded-packet information, transmission of a control message such as the entry setting (or deletion) request message addressed to the corresponding FW 5, reception of the alarm message from the corresponding FW 5, and so forth.

The control communication processing unit 76 is an example of a transmission unit if focusing on the transmission processing, and the control communication processing unit 76 is an example of a reception unit if focusing on the reception processing.

(Example of Hardware Configurations of FW and FWC)

Figure 27:
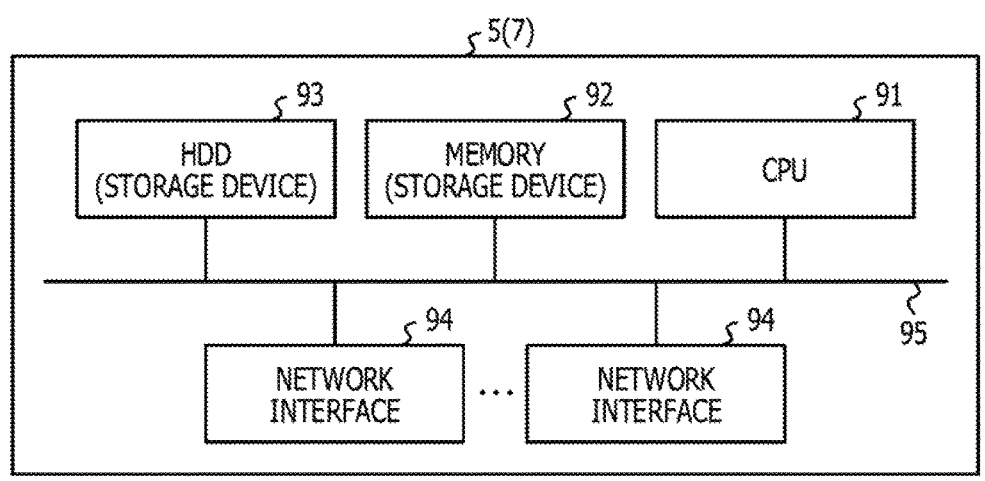
FIG. 27 is a block diagram illustrating an example of hardware configurations of the FW and the FWC exemplified in FIG. 25 and FIG. 26.

FIG. 27 is a block diagram illustrating an example of hardware configurations of the FWs 5 and the FWC 7. The hardware configuration exemplified in FIG. 27 may be applied to any one of the FWs 5 and the FWC 7.

The FWs 5 and the FWC 7 may each exemplarily include a CPU 91, a memory 92, a hard disk drive (HDD) 93, and network interfaces 94. The CPU 91, the memory 92, the HDD 93, and the network interfaces 94 may be coupled by a communication bus 95 so as to be able to communicate with one another.

The CPU 91 is an example of a processor equipped with an arithmetic capacity. The processor may be called a processor circuit or a processor device or may be called a "computer". The CPU 91 may be replaced by a DSP. The DSP is an abbreviation of a "digital signal processor".

The CPU 91 exemplarily arbitrarily reads, to the memory 92, programs and data stored in the HDD 93 and operates based on the read programs and data. Accordingly, the CPU 91 is able to operate as one of the FWs 5 and the FWC 7.

The memory 92 may be exemplarily a working memory of the CPU 91, and a semiconductor memory such as a RAM may be applied thereto. The RAM is an abbreviation of a "random access memory".

The HDD 93 stores therein the above-mentioned programs and data read by the CPU 91 to operate. The programs may include a program capable of causing the CPU 91 to operate as one of the FWs 5 and the FWC 7. The data may include data used for the operation of the CPU 91 and data generated in accordance with the operation of the CPU 91.

Each of the memory 92 and the HDD 93 is an example of a storage device or a storage medium. Additionally or alternatively, another storage device such as a solid state drive (SSD) or another storage medium may be used for the HDD 93. The memory 92 and the HDD 93 may be collectively called "storage units".

In accordance with the operation of the CPU 91 mounted in the corresponding FW 5, the functions of the respective discarded-packet collection unit 55 and processing load monitoring unit 56 exemplified in FIG. 25 may be embodied. The entry table 54 exemplified in FIG. 25 may be exemplarily stored in the HDD 93 in the corresponding FW 5.

In addition, in accordance with the operation of the CPU 91 mounted in the corresponding FW 5, the functions of the respective input processing unit 71 and FW entry calculation unit 75 exemplified in FIG. 26 may be embodied. The storage units 72 to 74 exemplified in FIG. 26 may be exemplarily embodied by the HDD 93 in the FWC 7. Some or all of, for example, the storage units 72 to 74 may correspond to one of the HDDs 93 or may correspond to one of areas obtained by dividing a storage area of one of the HDDs 93.

The network interface 94 is exemplarily an example of a communication interface or a coupling interface, which enables communication with the core network 2 or the sub-networks 3.

One of the network interfaces 94 mounted in the corresponding FW 5 may embody one of the control communication processing unit 51, the packet reception processing unit 52, and the packet transmission processing unit 53 exemplified in FIG. 25.

In addition, one the network interfaces 94 mounted in the FWC 7 may embody the control communication processing unit 76 exemplified in FIG. 26.

Note that in a case where the FWs 5 and the FWC 7 are generated as VMs, it may be thought that each of the FW 5 exemplified in FIG. 25 and the FWC 7 exemplified in FIG. 26 is generated as a VM in accordance with an operation in which the CPU 91, the memory 92, and the HDD 93, mounted in a computer such as a general-purpose server, harmoniously work with one another.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A firewall control device configured to control a plurality of firewall devices provided between a core network and a plurality of sub-networks respectively, the plurality of firewall devices being configured to discard received data based on discarding flow entries defining discarding of data, the firewall control device comprising:
    a memory; and
    a processor coupled to the memory and configured to:
        receive, from the plurality of firewall devices, data amount information indicating an amount of the data discarded in the plurality of firewall devices, based on the discarding flow entries, respectively and node information indicating a transmission source node of the discarded data,
        identify, based on the data amount information and the node information, data flows including the discarded data which are transmitted from an information processing device indicated by the node information as a single source device of the data flows and of which total sum of the amount of the data discarded at the plurality of firewall devices respectively exceeds a threshold value, and
        set, in a first firewall device which is included in the plurality of firewall devices and which is provided between the core network and the information processing device, a first discarding flow entry defining discarding of data of the identified data flows.

2. The firewall control device according to claim 1, wherein the memory is configured to store therein the discarding flow entries set in the plurality of firewall devices, and the processor is further configured to:

modify the node information of a second discarding flow entry to the node information of the identified first data flow when the second discarding flow entry specifying a processing method contradictory to a data processing method specified in the first discarding flow entry is stored in the memory, and set the modified second discarding flow entry in the first firewall device.

3. The firewall control device according to claim 2, wherein the node information further indicates a transmission destination node of the discarded data.

4. The firewall control device according to claim 3, wherein the processor is further configured to:

determine a number of the discarding flow entries for the first data flow in which the total amount of the discarded data for each combination of the transmission source node and the transmission destination node exceeds the threshold value, determine a number of the discarding flow entries for a second data flow in which the total amount of the discarded data for each of the transmission source node exceeds the threshold value, select a data flow having a smaller number of the discarding flow entries, from the first data flow and the second data flow, generate a discarding flow entry specifying discarding of data of the selected data flow, and set, as the first discarding flow entry, the generated discarding flow entry in the first firewall device.

5. The firewall control device according to claim 1, wherein the processor is further configured to:

generate an entry setting request message including information of the first discarding flow entry, and transmit the entry setting request message to the first firewall device.

6. A method using a control device configured to control a plurality of firewall devices provided between a core network and a plurality of sub-networks respectively, the plurality of firewall devices being configured to discard received data based on discarding flow entries defining discarding of data, the method comprising:

receiving, by the control device, from the plurality of firewall devices, data amount information indicating an amount of the data discarded in the plurality of firewall devices, based on the discarding flow entries, respectively and node information indicating a transmission source node of the discarded data;

identifying, by the control device, based on the data amount information and the node information, data flows including the discarded data which are transmitted from an information processing device indicated by the node information as a single source device of the data flows and of which total sum of the amount of the data discarded at the plurality of firewall devices respectively exceeds a threshold value; and setting, by the control device, in a first firewall device which is included in the plurality of firewall devices and which is provided between the core network and the information processing device, a first discarding flow entry defining discarding of data of the identified data flows.

7. The method according to claim 6 further comprising:

storing, by the control device, the discarding flow entries set in the plurality of firewall devices;

modifying, by the control device, the node information of a second discarding flow entry to the node information of the identified first data flow when the second discarding flow entry specifying a processing method contradictory to a data processing method specified in the first discarding flow entry is stored in the memory; and setting, by the control device, the modified second discarding flow entry in the first firewall device.

8. The method according to claim 7, wherein the node information further indicates a transmission destination node of the discarded data.

9. The method according to claim 8 further comprising:

determining, by the control device, a number of the discarding flow entries for the first data flow in which the total amount of the discarded data for each combination of the transmission source node and the transmission destination node exceeds the threshold value;

determining, by the control device, a number of the discarding flow entries for a second data flow in which the total amount of the discarded data for each of the transmission source node exceeds the threshold value;

selecting, by the control device, a data flow having a smaller number of the discarding flow entries, from the first data flow and the second data flow;

generating, by the control device, a discarding flow entry specifying discarding of data of the selected data flow; and setting, by the control device, as the first discarding flow entry, the generated discarding flow entry in the first firewall device.

10. The method according to claim 6 further comprising:

generating, by the control device, an entry setting request message including information of the first discarding flow entry; and transmitting, by the control device, the entry setting request message to the first firewall device.

* * * * *